US009015693B2

(12) United States Patent
Goller et al.

(10) Patent No.: US 9,015,693 B2
(45) Date of Patent: *Apr. 21, 2015

(54) SYSTEM AND METHOD FOR MODIFYING AND UPDATING A SPEECH RECOGNITION PROGRAM

(75) Inventors: Michael D Goller, Cincinnati, OH (US); Stuart E Goller, Cincinnati, OH (US)

(73) Assignee: Google Inc., Mountain View, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/243,020

(22) Filed: Sep. 23, 2011

(65) Prior Publication Data

US 2012/0253800 A1 Oct. 4, 2012

Related U.S. Application Data

(63) Continuation of application No. 11/621,561, filed on Jan. 10, 2007, now Pat. No. 8,056,070.

(51) Int. Cl.
G06F 9/44 (2006.01)
G10L 15/28 (2013.01)
G06F 9/445 (2006.01)

(52) U.S. Cl.
CPC .. *G10L 15/28* (2013.01); *G06F 8/65* (2013.01)

(58) Field of Classification Search
USPC .......... 704/231, 275, 246, 260, 270; 717/163, 717/125, 168, 173–174; 709/246, 218; 715/501.1, 234; 707/10, 203; 713/200; 455/411, 419; 705/1
See application file for complete search history.

(56) References Cited

U.S. PATENT DOCUMENTS

| 6,654,955 | B1 * | 11/2003 | Kusnitz et al. | 717/163 |
| 6,912,691 | B1 * | 6/2005 | Dodrill et al. | 715/234 |
| 7,334,050 | B2 * | 2/2008 | Zondervan et al. | 709/246 |
| 7,484,207 | B2 * | 1/2009 | Sato | 717/174 |
| 7,643,998 | B2 * | 1/2010 | Yuen et al. | 704/275 |
| 7,831,422 | B1 * | 11/2010 | Jochumson | 704/231 |
| 2002/0178003 | A1 * | 11/2002 | Gehrke et al. | 704/246 |

(Continued)

OTHER PUBLICATIONS

Vartiainen, E. et al. "Auto-update: a concept for automatic downloading of web content to a mobile device". Sep. 2007. In Proceedings of the 4th international conference on mobile technology, applications, and systems and the 1st international symposium on Computer human interaction in mobile technology, ACM. (pp. 683-689).*

*Primary Examiner* — Lewis A Bullock, Jr.
*Assistant Examiner* — Gilles Kepnang
(74) *Attorney, Agent, or Firm* — McDonnell Boehnen Hulbert & Berghoff LLP

(57) ABSTRACT

The system provides a speech recognition program, an update website for updating a speech recognition program, and a way of storing data. A user may utilize an update website, to add, modify, and delete items that may comprise speech commands, dll's, multimedia files, executable code, and other information. Speech recognition program may communicate with update website to request information about possible updates. Update website may send a response consisting of information to speech recognition program. Speech recognition program may utilize received information to decide what items to download. A speech recognition program may send one or more requests to update website to download items. Update website may respond by transmitting, requested items to a speech recognition program that overwrite existing items with newly received items.

10 Claims, 21 Drawing Sheets

(56) References Cited

U.S. PATENT DOCUMENTS

| | | | |
|---|---|---|---|
| 2002/0188736 A1* | 12/2002 | Jarvensivu | 709/229 |
| 2003/0191650 A1* | 10/2003 | Turner et al. | 705/1 |
| 2004/0111259 A1* | 6/2004 | Miller et al. | 704/231 |
| 2005/0028007 A1* | 2/2005 | Hashiguchi | 713/200 |
| 2005/0164692 A1* | 7/2005 | Roth et al. | 455/419 |
| 2005/0203968 A1* | 9/2005 | Dehghan et al. | 707/203 |
| 2005/0223310 A1* | 10/2005 | Wachholz-Prill et al. | 715/501.1 |
| 2005/0283764 A1* | 12/2005 | Chiu | 717/125 |
| 2007/0073718 A1* | 3/2007 | Ramer et al. | 707/10 |
| 2007/0112571 A1* | 5/2007 | Thirugnana | 704/270 |
| 2007/0179778 A1* | 8/2007 | Gong et al. | 704/9 |
| 2007/0255806 A1* | 11/2007 | Kurganov | 709/218 |
| 2007/0276651 A1* | 11/2007 | Bliss et al. | 704/9 |
| 2007/0294684 A1* | 12/2007 | Kumashiro et al. | 717/168 |
| 2008/0059191 A1* | 3/2008 | Huang et al. | 704/260 |
| 2008/0301669 A1* | 12/2008 | Rao et al. | 717/173 |
| 2009/0125899 A1* | 5/2009 | Unfried | 717/168 |
| 2009/0187901 A1* | 7/2009 | Kanai | 717/173 |
| 2009/0300596 A1* | 12/2009 | Tyhurst et al. | 717/173 |
| 2010/0106497 A1* | 4/2010 | Phillips | 704/231 |
| 2010/0233996 A1* | 9/2010 | Herz et al. | 455/411 |
| 2011/0047452 A1* | 2/2011 | Ativanichayaphong et al. | 715/234 |
| 2011/0060586 A1* | 3/2011 | Dhawan et al. | 704/231 |

* cited by examiner

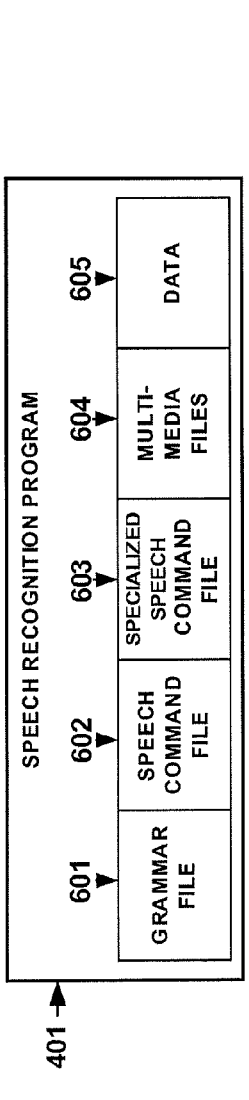
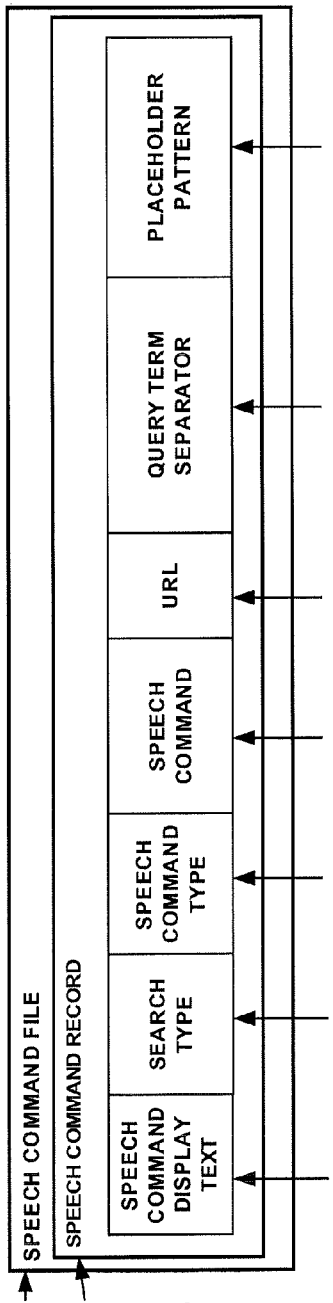
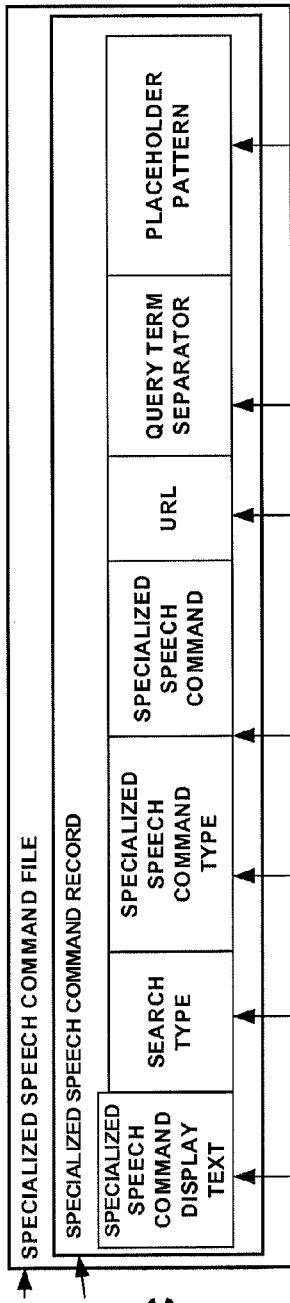
FIG. 6A
FIG. 6B
FIG. 6C

SYSTEM AND METHOD FOR MODIFYING AND UPDATING A SPEECH RECOGNITION PROGRAM

FIELD OF INVENTION

The present invention relates generally to updating speech recognition software and, more specifically, to management of the updating process through use of a website, followed by downloading updates from the website, to a speech recognition program.

PRIORITY

This application claims priority to U.S. Non-Provisional Patent Application titled "SYSTEM AND METHOD FOR MODIFYING AND UPDATING A SPEECH RECOGNITION PROGRAM," Ser. No. 11/621,561, filed on Jan. 10, 2007, the disclosure of which is incorporated by reference in its entirety.

BACKGROUND OF THE INVENTION

Speech recognition systems, i.e. systems for recognizing spoken language, are rapidly increasing in significance in many areas of data and communications technology. Speech recognition systems typically are comprised of a computing system loaded with a speech recognition program for processing. Many speech recognition programs have a grammar, sometimes also called a dictionary, either built in or in some other way available to the program.

Speech recognition programs can be constructed for installation and use in servers, as stand alone applications in client devices, and now in some browser applications.

Speech recognition programs designed for use in client devices are currently available from companies such as IBM, Nuance, Phillips, Loquendo, and Microsoft, as well as others. Speech recognition programs for use in servers are provided by many of the same as well as other suppliers. Some suppliers manufacture speech recognition programs for cell phone, and PDA platform applications.

Speech recognition programs are currently used in many applications such as interactive voice response systems, command recognition systems giving direction to a computer or device, dictation mode systems including medical transcription, speaker identification, speech analytics, keyword processing, automotive applications, and hypertext navigation including multi-modal navigation.

In each of the applications and platforms listed above, except dictation mode systems, a grammar may be required. The grammar could be in one of many different forms such as a database, XML file, other file type, dynamic data, or other data form, accessible by a speech recognition program. Most grammars are generally not accessible by speech recognition programs other than those they were designed to operate with.

Currently grammars in speech recognition programs are not easily updated. Some manufacturers of speech recognition programs may offer grammar replacements, but none offer solutions which may allow a user or an administrator to modify a grammar. Modifying a grammar instead of replacing a grammar can be valuable in many applications such as in command and control applications where a fixed grammar is made up of speech commands. Updating other components of a speech recognition program may also be valuable.

As an example, there may be a clear benefit if a user or administrator can update one or more speech commands, or the actions triggered by speech commands, without having to contact the manufacturer of the speech recognition software and requesting new software.

U.S. Pat. No. 7,146,323 discloses a method and system for gathering information by voice input, further described, as a hypertext navigation system combining the advantages of a point and click hypertext navigation system with prior art voice controlled hypertext navigation system. On the server, the main components are a Web server or HTTP-Server; one or more Web applications, or servlets; and an application server and or data base. On the client device the speech recognition and synthesis systems are available to signed Java applets. The main component, as illustrated in the invention, is a voice navigation component (applet) that performs the following steps: locates, selects, and initializes a speech recognition engine and a speech synthesis engine; defines, enables, and disables decoding grammars; and processes the recognition results (e.g. launches HTTP requests, initiates spoken words, and plays back of prerecorded prompt). It is possible to use general grammars or language models that are available at the client side. Usually such grammars can be installed along with the general speech recognition engine. Furthermore it is required to upload application dependent, or so called information dependent, grammars from the server to the client. These grammars specify the recognition vocabulary for navigating within related Web pages, Web pages belonging to a Web application, or related Web applications. A further component of their invention is a conventional point and click navigation component (applet) as used in existing prior art systems. The point and click component (applet PACNA) can load new Web pages responsive to user selection (pointing and clicking) of a hyperlink displayed in an HTML document. Both the voice navigation component (applet) and the point and click navigation (applet) are originally stored on the server system. Preferably, the loading of an initial web page from the server into the client can automatically initiate a loading of both the voice navigation component (applet) and the point and click navigation (applet). In the client device a Java Virtual Machine must be available for processing any uploaded applets including any grammar.

A disadvantage of the above mentioned system is the requirement to upload application dependent, or so called information dependent, grammar from the server to a client device as part of a voice navigation component Java applet. The information dependent grammar as a part of an applet, specifies the recognition vocabulary for navigating within related Web pages, Web pages belonging to a Web application, or related Web applications, thereby limiting the grammar to the Web pages or Web applications loaded. The above mentioned system loads grammar. The above mentioned system does not update grammar. Another disadvantage is that, a Java Virtual Machine must be available for processing any uploaded applets in the client device. This prevents non-Java systems from utilizing the invention. Furthermore, this prior art system does not include any method of updating and modifying components of a speech recognition program which may include grammar, dll's, multimedia files, advertisements, or other information.

U.S. Pat. No. 7,139,715 discloses a system and method for providing remote automatic speech recognition and text to speech services via a packet network, further described as a client-server based system wherein a client device loads a relatively small program, named ASR Client, that communicates with a speech recognition program in a server. The client device includes hardware, such as a microphone, and software for the input and capture of audio sounds, such as speech. The client device ASR Client program is loaded with one or more grammars that are activated by a user. The words in the grammar are transmitted to the speech recognition program in the server where the server recognizes the words triggering actions in the server. In another embodiment the ASR Client program sends to the server an identifier representing a grammar to be utilized by the server.

A disadvantage of the above mentioned system is that there is no method of updating grammars, dll's, multimedia files, or other information.

U.S. patent application Ser. No. 11/557,971, describes a speech interface for search engines, but does not offer a method to update grammar, and other components.

It is therefore the object of the present invention to provide a system and method of updating a speech recognition program.

SUMMARY OF THE INVENTION

A system and method for updating a speech recognition program. The system provides a speech recognition program, an update website for updating a speech recognition program, and a database for storing data that may be used to update a speech recognition program. A user may utilize an update website, to add, modify, and delete speech recognition program information that may include: speech commands, dll's, multimedia files, executable code, and other information. Speech recognition program may communicate with update website to request information about possible updates. Update website may send a response of information to speech recognition program. Speech recognition program may utilize received information to decide what speech commands, dll's, multimedia files, executable code, and other information it may want to download. A speech recognition program may send one or more requests to update website to download speech commands, dll's, multimedia files, executable code, and other information. Update website may respond by transmitting, requested speech commands, dll's, multimedia files, executable code, and other information, to a speech recognition program. Speech recognition program may overwrite speech commands, dll's, multimedia files, executable code, and other information, with newly received speech commands, dll's, multimedia files, executable code, and other information.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 illustrates exemplary components of a speech recognition program, consistent with the present invention;

DETAILED DESCRIPTION

The present invention described below illustrates a system and method for modifying and updating a speech recognition program. The following detailed description of the invention refers to the accompanying drawings. The same reference numbers in different drawings identify the same or similar elements. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention. Also the following detailed description does not limit the invention. Instead, the scope of the invention is defined by the appended claims.

Exemplary Network

Figure 1:
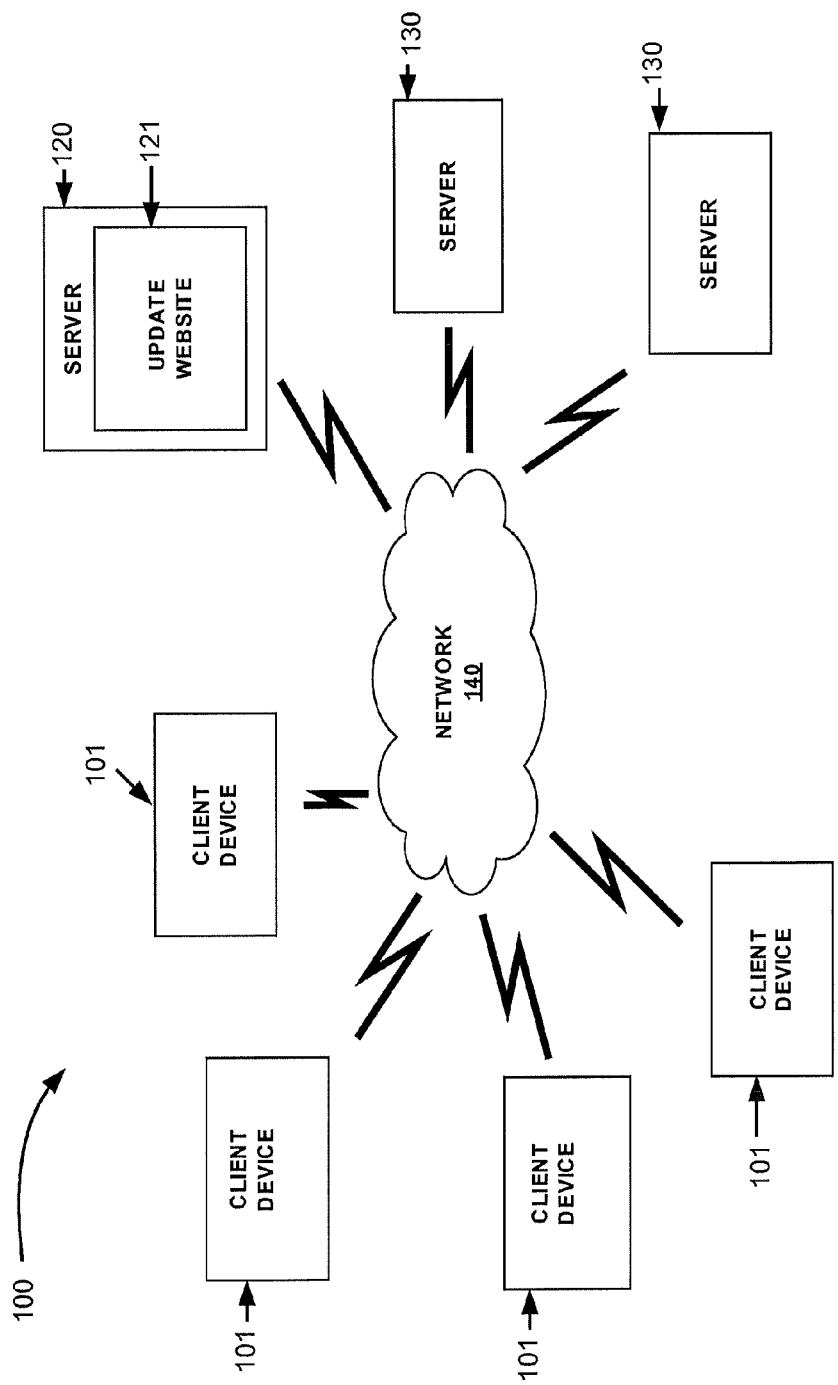
FIG. 1 illustrates an exemplary network in which a system and a method, consistent with the present invention may be implemented.

FIG. 1 illustrates an exemplary network 100 in which a system and method, consistent with the present invention, may be implemented. The network 100 may include multiple client devices 101 connected to a server 120 and other types of servers 130 via a network 140. The network 140 may include a local area network (LAN), a wide area network (WAN), a telephone network such as the Public Switched Telephone Network (PSTN), an intranet, the Internet, or a combination of networks. Four client devices 101 and one server 120 and other types of servers 130 have been illustrated as connected to network 140 for simplicity. In practice, there may be more or less client devices and servers and other types of servers. Also, in some instances, a server may perform the functions of a client device and a client device may perform the functions of a server.

A client device 101 may include devices, such as mainframes, minicomputers, personal computers, laptops, personal digital assistants, telephones, console gaming devices, set top boxes, cell phones or the like, capable of connecting to the network 140. The client device 101 may transmit data over the network 140 or receive data from the network 140 via a wired, wireless, or optical connection.

The servers 120-130 may include one or more types of computer systems, such as a mainframe, minicomputer, or personal computer, capable of connecting to the network 140 to enable servers 120-130 to communicate with a client device 101. In alternative implementations, the servers 120-130 may include mechanisms for directly connecting to one or more client devices 101. The servers 120-130 may transmit data over network 140 or receive data from the network 140 via a wired, wireless, or optical connection.

One update website 121 is illustrated as residing in one server 120. In practice, the network 140 may comprise more or less servers 120 with each server containing one or more update websites 121.

Exemplary Client Architecture

Figure 2:
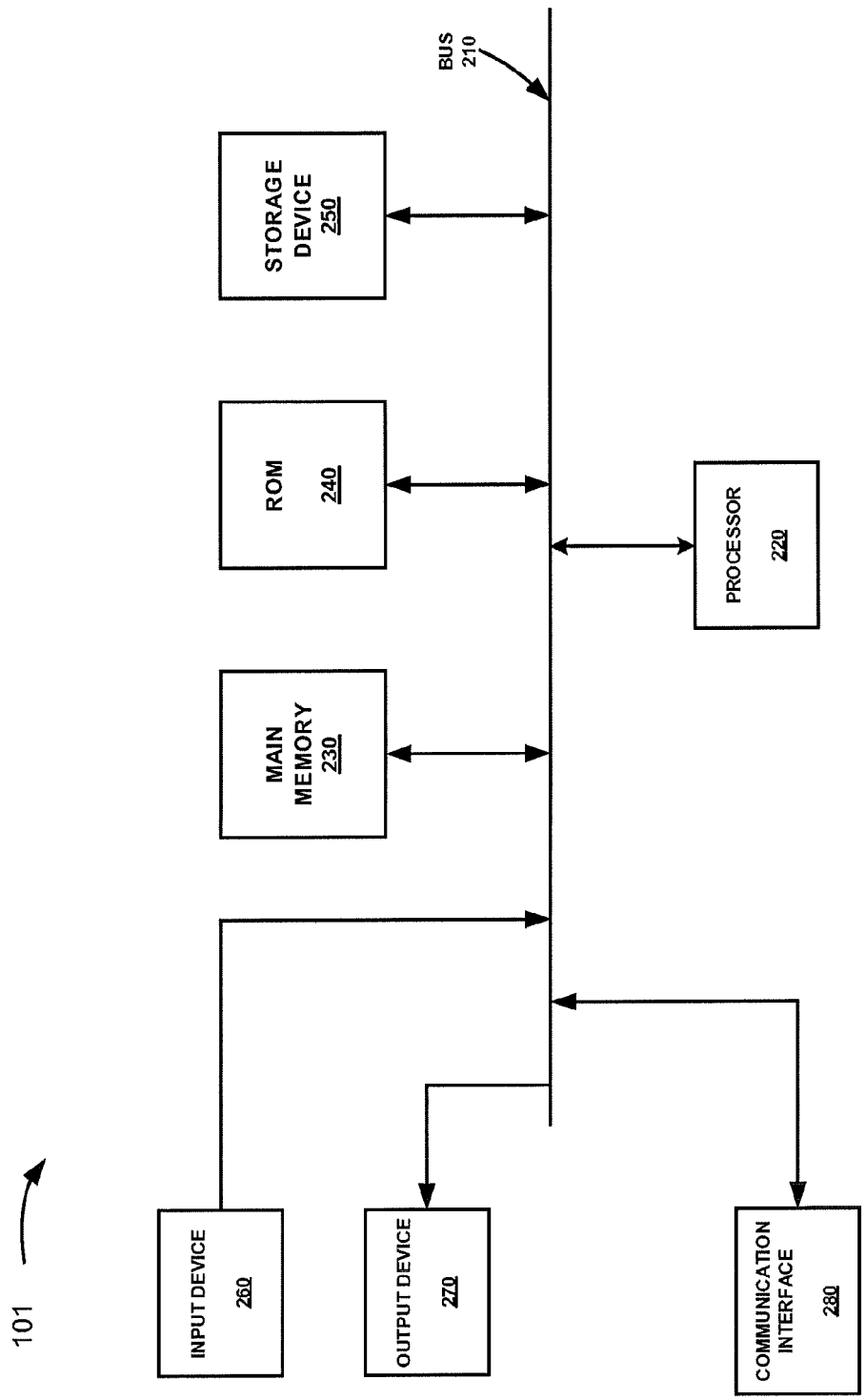
FIG. 2 illustrates an exemplary client device consistent with the present invention.

FIG. 2 illustrates an exemplary client device 101 consistent with the present invention. The client device 101 may include a bus 210, a processor 220, a main memory 230, a read only memory (ROM) 240, a storage device 250, an input device 260, an output device 270, and a communication interface 280. The bus 210 may include one or more conventional buses that permit communication among the components of the client device 101.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include one or more conventional mechanisms that permit a user to input information to the client device 101, such as a keyboard, a mouse, a pen, a microphone, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 101 to communicate with other devices and/or systems. For example, the communication interface 280 may include mechanisms for communicating with another device or system via a network, such as network 140.

As will be described in detail below, a client device 101, consistent with the present invention, may perform certain updating-related operations. The client device 101 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform the updating-related activities described below. Alternatively, hardwired circuitry may be used in place of or in combination with software instructions to implement processes consistent with the present invention. Thus, the present invention is not limited to any specific combination of hardware circuitry and software.

Exemplary Server

Figure 3:
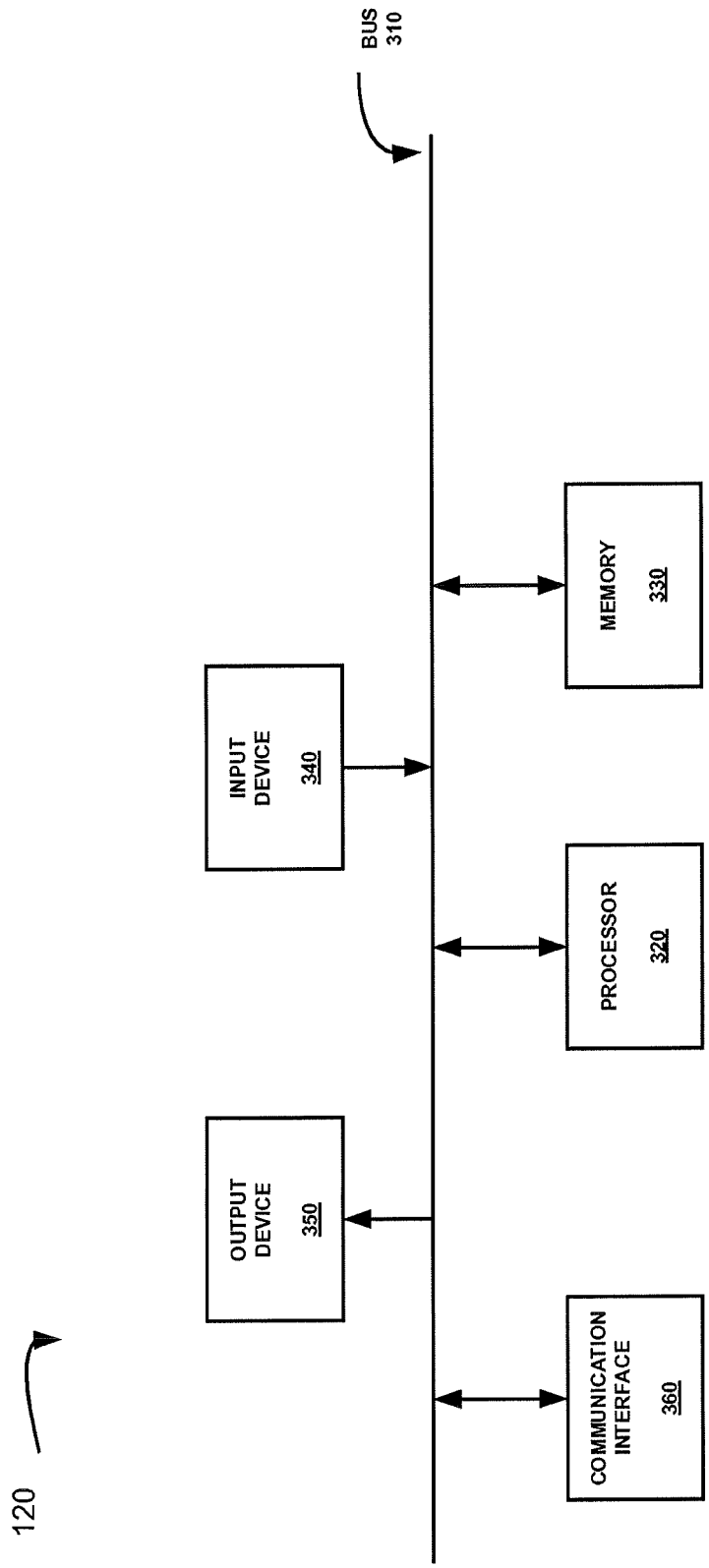
FIG. 3 illustrates an exemplary server consistent with the present invention.

FIG. 3 illustrates an exemplary server 120 consistent with the present invention. Server 130 may be similarly configured. The server 120 includes a bus 310, a processor 320, a memory 330, an input device 340, an output device 350, and a communication interface 360. The bus 310 may include one or more conventional buses that allow communication among the components of the server 120.

The processor 320 may include any type of conventional processor or microprocessor that interprets and executes instructions. The memory 330 may include a RAM or another type of dynamic storage device that stores information and instructions for execution by the processor 320; a ROM or another type of static storage device that stores static information and instructions for use by the processor 320; and/or some type of magnetic or optical recording medium and its corresponding drive.

The input device 340 may include one or more conventional devices that permit an operator to input information to the server 120, such as a keyboard, a mouse, a pen, a microphone, voice recognition and/or biometric mechanisms, and the like. The output device 350 may include one or more conventional devices that outputs information to the operator, including a display, a printer, a speaker, etc. The communication interface 360 may include any transceiver-like mechanism that enables the server 120 to communicate with other devices and/or systems. For example, the communication interface 360 may include mechanisms for communicating with other servers 130 or a client device 101 via a network, such as network 140.

Execution of the sequences of instructions contained in memory 330 causes processor 320 to perform the functions described below. In alternative embodiments, hardwired circuitry may be used in place of or in combination with software instructions to implement the present invention. Thus, the present invention is not limited to any specific combination of hardware circuitry and software.

Exemplary Speech Recognition Program

Figure 4:
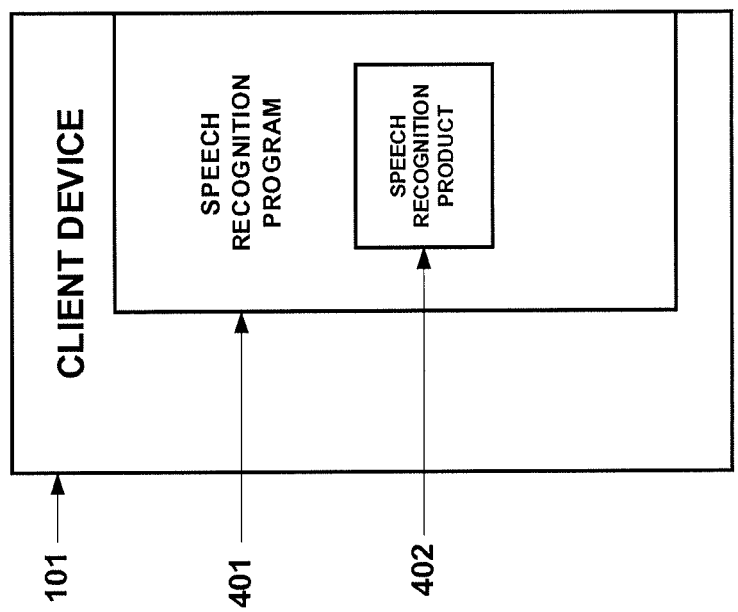
FIG. 4 illustrates an exemplary client device with a speech recognition program, consistent with the present invention.

FIG. 4 illustrates a client device 101, consistent with the present invention, in which a speech recognition program 401 may be loaded into client device 101. It will be appreciated, however, that one or more, client devices 101, servers 120, or servers 130 may alternatively be loaded with a speech recognition program 401, and may perform the entire process or part of the process described below.

Speech recognition program 401 in client device 101 may have components programmed into it that may be update-able, replace-able, or delete-able.

A speech recognition program 401 in client device 101 may incorporate a speech recognition product 402. A speech recognition product 402 may be a product such as IBM ViaVoice, Nuance's Dragon NaturallySpeaking 9, or other speech recognition software as offered by Phillips, Loquendo, Microsoft, or others. A speech recognition product 402 may be an off the shelf or custom programmed speech recognition software. These speech recognition products may include a speech recognition engine, a grammar, a means for input, a means for output. Components of speech recognition product 402 may be update-able. Programming and operation of a product such as speech recognition product 402 is well known to those familiar in the art of speech recognition programming and not discussed in detail here.

In another implementation of the current invention, a speech recognition program 401 in client device 101 may be comprised of only a speech recognition product 402.

Figure 5:
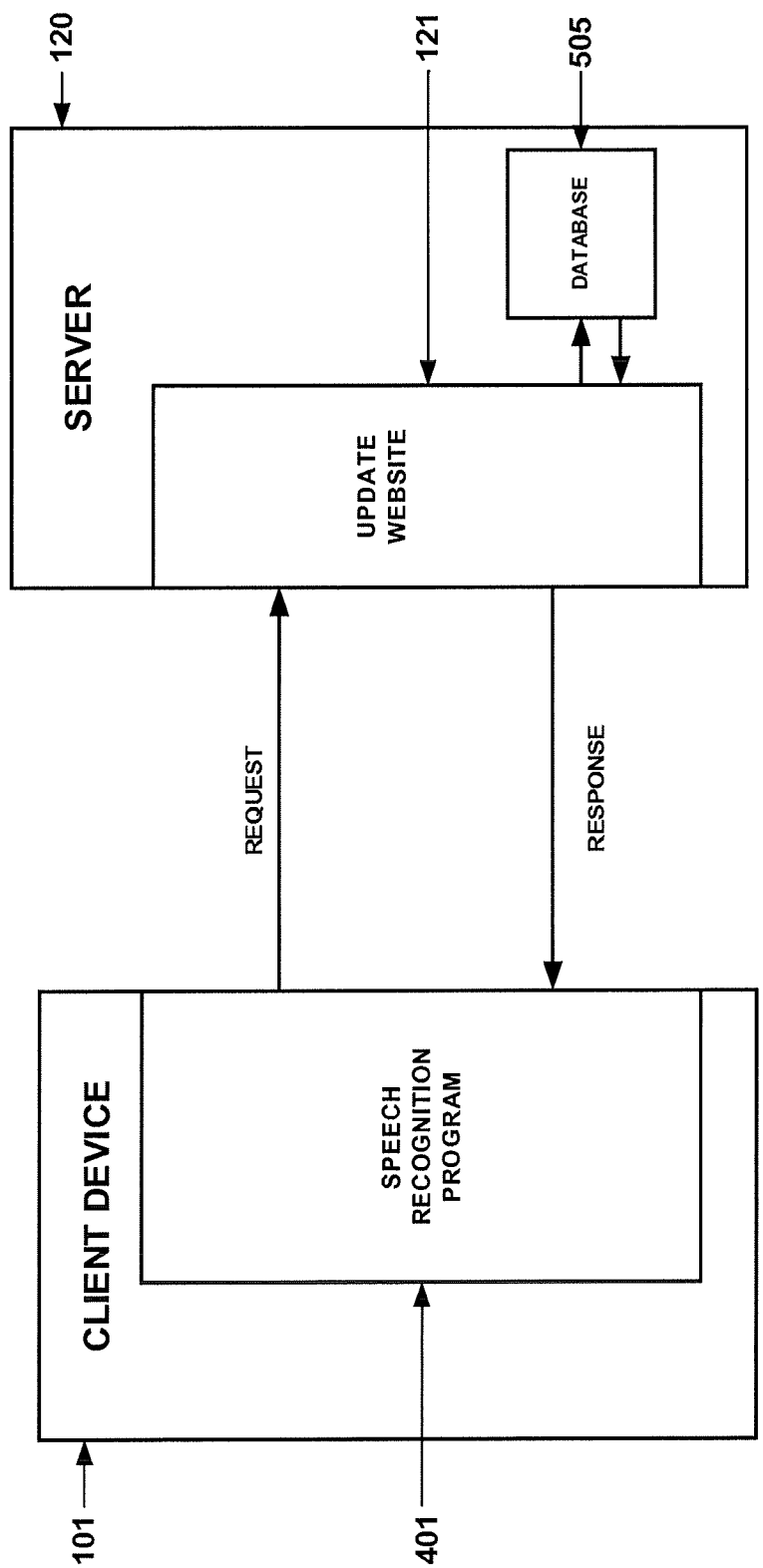
FIG. 5 illustrates an exemplary speech recognition program in a client device communicating with an update website in a server, with a database, consistent with the present invention.

As illustrated in FIG. 5, speech recognition program 401 in client device 101 may interact with an update website 121 in server 120. This interaction is via network 140 as illustrated previously in FIG. 1. The general purpose of interacting may be to check for updates that may be available for download to speech recognition program 401 in client device 101. An additional purpose of interacting with speech recognition program 401 in client device 101, may be to download updates. Other interactions may occur.

Update website 121 in server 120 may be connected to a storage means such as database 505. Data input via update website 121 in server 120 may be stored in a storage means, such as database 505. Database 505 may store data received from sources other than speech recognition program 401. Database 505 may store data as records of linked information. Database 505 may contain data stored in one or more files in an XML or other text format. Database 505 may contain one or more linked tables of data. Database 505 may store binary code. Database 505 may store analog data. Database 505 may store algorithms. Data stored in database 505 may be accessible by both speech recognition program 401 and update website 121 in server 120. Data stored in database 505 may be accessible to other programs and systems. In an implementation consistent with the present invention the storage means may be a file system.

Database 505 may reside in one or more servers 120-130 and/or client devices 101. Database 505 may be split up with various database components residing in one or more servers 120-130 and/or client devices 101.

Database 505 may generate dynamic or other responses to requests.

As will be described in further detail in sections below, data and information may be added, modified, and deleted from database 505.

FIGS. 6A, 6B, 6C illustrate files and information that may reside in a speech recognition program 401 in client device 101. Files and information in a speech recognition program 401 in client device 101 may include: grammar file 601, speech command file 602, specialized speech command file 603, multimedia files 604, data 605. These files and information may be update-able replace-able or delete-able. In addition, these files and information may be created by an update website 121 in server 120. These files and information may reside in a database 505. These files and information may reside in a server 120-130. These files and information may reside in a update website 121 in server 120. Other files, data, executable code, information, and/or software components may be included in a speech recognition program 401 and may be update-able.

A grammar file 601 may include one or more files. A speech recognition program 401 may compare a grammar file 601 against a detected input from a user. A detected input from a user may be utterances.

Based upon the results of the comparison, speech recognition program 401 may produce a speech recognition result that represents the detected input. A speech recognition program 401 may be programmed to perform a action in response to a speech recognition result.

In an implementation consistent with the present invention a grammar file 601 may be compiled into a binary file.

Data 605 may represent the date-times of the most recent updates of files, data, executable code, and/or other information. Data 605 may include other information.

In an implementation consistent with the present invention zero, one, or more speech command files 602 may be included in a speech recognition program 401.

In an implementation consistent with the present invention zero, one, or more specialized speech command files 603 may be included in a speech recognition program 401.

FIG. 6B illustrates a speech command file 602, which may include a speech command record 610. A speech command record 610 may include: speech command display text 611, search type 612, speech command type 613, speech command 614, uniform resource locator (URL) 615, query term separator 616, and a placeholder pattern 617. A speech command record 610 may include text data, binary data, other types of data. The contents of a speech command record 610 may be linked.

A speech command 614 may be text that a speech recognition program 401 may use for multiple purposes that may include: identifying a detected input from a user, identifying an action triggered by a detected input from a user. One or more speech commands 614 may be used in constructing a grammar file 601, speech command file 602, specialized speech command file 603.

In an implementation consistent with the present invention, a speech command 614 may be used to construct other files.

In an implementation consistent with the present invention, zero, one, or more speech command records 610, may be in a speech command file 602. In another implementation consistent with the present invention, a speech command record 610 may include one or more data fields.

In an implementation consistent with the present invention, FIG. 6C illustrates information that may be updated in a specialized speech command file 603, which may include a specialized speech command record 620. A specialized speech command record 620 may include: specialized speech command display text 621, search type 622, specialized speech command type 623, specialized speech command 624, uniform resource locator (URL) 625, query term separator 626, and a placeholder pattern 627. A specialized speech command 624 may be text that a speech recognition program 401 may use for multiple purposes that may include: identifying a detected input from a user, identifying an action triggered by a detected input from a user. One or more specialized speech commands 624 may be used in constructing a grammar file 601, and/or specialized speech command file 603. A specialized speech command 624 may be used to construct other files.

A specialized speech command record 620 may include text data, binary data, other types of data. The contents of a specialized speech command record 620 may be linked.

In an implementation consistent with the present invention, zero, one, or more specialized speech command records 620, may be in a specialized speech command file 603. In another implementation consistent with the present invention, a specialized speech command record 620 may include one or more data fields.

A business, university, or other entity may want to identify and update installations of speech recognition program 401, that may incorporate specialized speech commands 624 specific to the business, university, or other entity. To accommodate such a desire, an identifier may be incorporated into speech recognition program 401. Different identifiers may identify distinct editions of speech recognition program 401. An identifier of a specialized speech command edition of a speech recognition program 401, may be recognizable by an update website 121 in server 120. Update website 121 in server 120 may be able to differentiate an update request from an edition of speech recognition program 401 incorporating an identifier, from an edition not incorporating an identifier. Update website 121 in server 120 may be able to differentiate an update request from an edition of speech recognition program 401 incorporating an identifier, from an edition incorporating a different identifier.

A business, university, or other entity may utilize one or more editions of speech recognition program 401.

Speech recognition program 401 may be installed as a supporting function of a device. Such a device may have a different primary function. As an example, a device with a primary function that is medical in nature, hereafter referred to as medical device, may be configured to also function as a client device 101 on a network 140. The medical device also functioning as a client device 101, may have installed into it, a speech recognition program 401. One or more of the medical devices also functioning as a client device 101, may be installed in different doctors offices and hospitals and may be connected via network 140 to update website 121 in server 120. In addition, the manufacturer of the medical device may have one or more other medical device products, each including a speech recognition program 401, also functioning as client devices 101. The other medical device products may be installed at doctors offices and hospitals and may be connected to update website 121 in server 120 via network 140. A medical device or a medical device product, also functioning as a client device 101, may have a unique set of specialized speech commands 624. Each speech recognition program 401 in a medical device or medical device product, may be a separate edition. Each edition may be updated separately from other editions. There may be one or more different manufacturers, each using their own specialized speech command editions of speech recognition program 401. Medical devices also functioning as a client device 101, were used here as an example, but other devices in other industries may have a speech recognition program 401 edition with specialized speech commands 624 installed into it.

Exemplary Update Website

In this implementation, an interface for updating a speech recognition program 401 in client device 101 may be illustrated as being a website. Those skilled in the art will appreciate that the described techniques are not limited to this implementation and may be used in any user interface.

Figure 7:
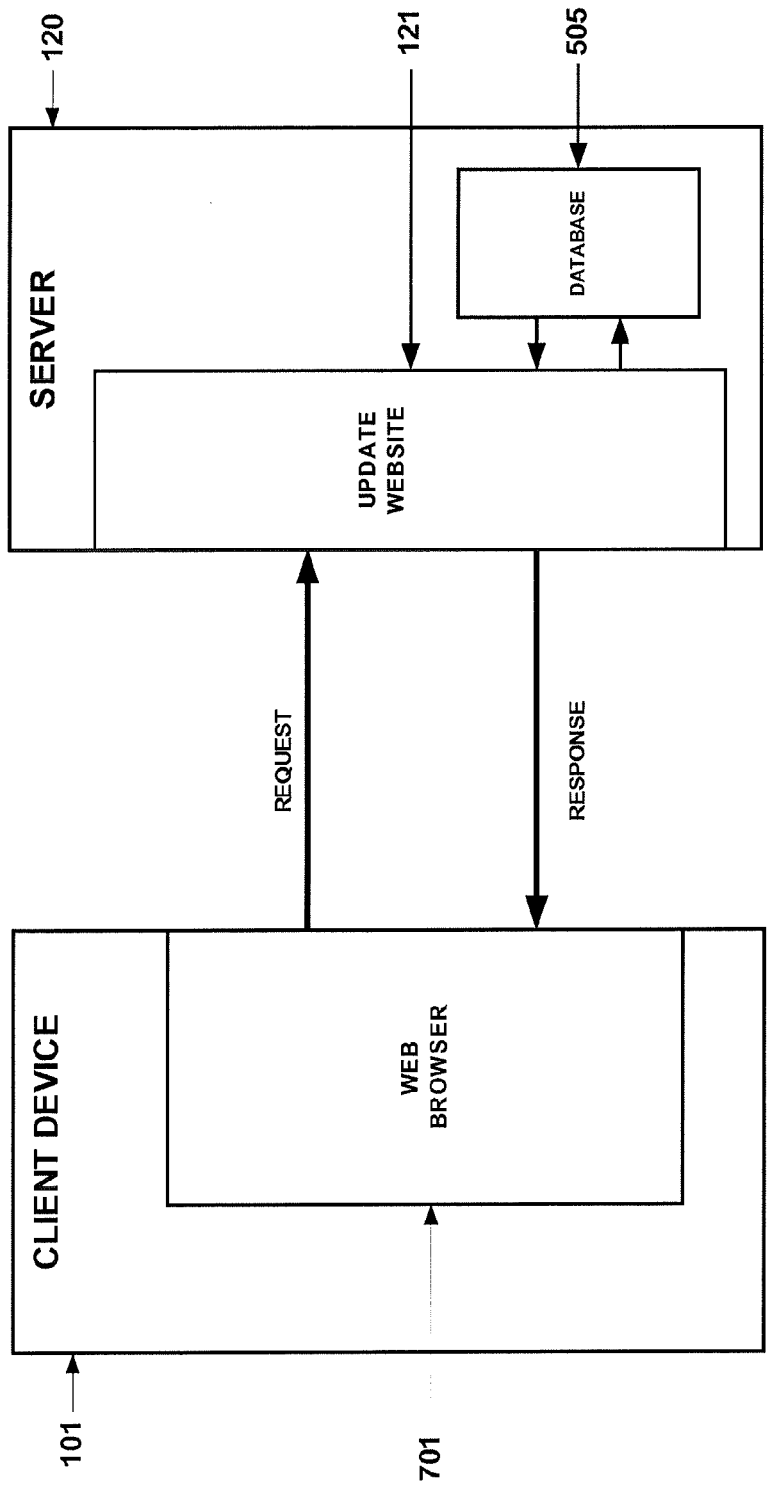
FIG. 7 illustrates an exemplary web browser in a client device communicating with an update website in a server, with a database, consistent with the present invention.

In FIG. 7, a web browser 701 may be opened by a client device 101. Web browser 701 in client device 101 may send requests to, and may receive responses from an update website 121 in server 120. Update website 121 may be connected to database 505.

Database 505 may generate dynamic or other responses, in response to requests from update website 121.

A login facility that may be a web page may be included in update website 121. A user may login [2005]. A user of update website 121, may be an administrator assigned to update speech commands and other data in various editions of a speech recognition program 401 in client device 101.

FIGS. 8-19 describe various types of records and the exemplary web pages of an update website 121 in a server 120. Each web page in update website 121 may include a menu such as menu 803 as illustratively displayed in FIG. 8. Menu 803 may contain links a user may click to navigate to other web pages within the same website or other websites. A user may utilize an update website 121, to add, modify, and delete speech recognition program information that may include: speech commands, dll's, multimedia files, executable code, and other information.

Figure 8:
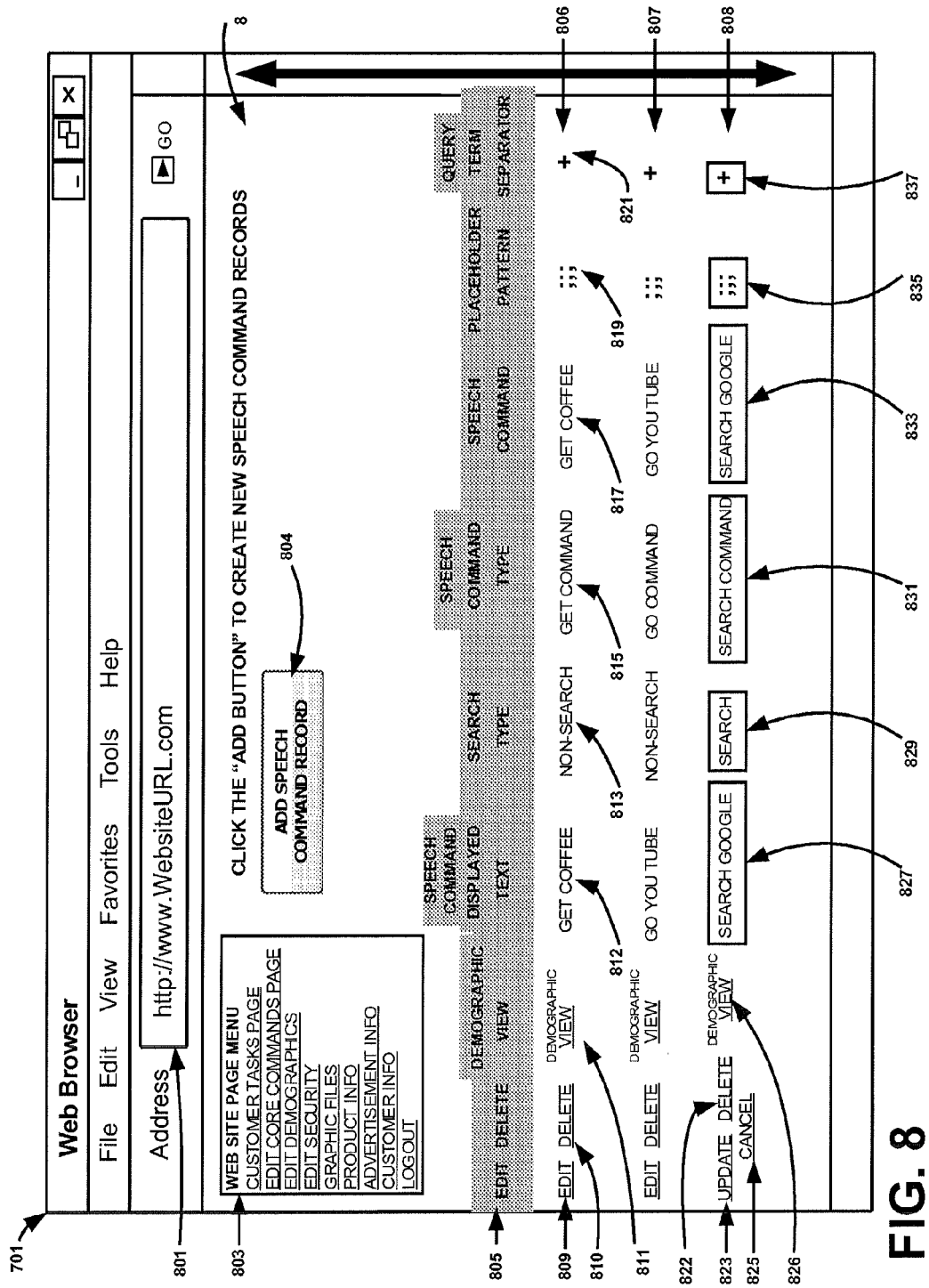
FIGS. 8-19 are exemplary records and screen shots of an update website, consistent with the present invention.

In FIG. 8, as an example, a web page 8 of an update website 121, appearing in web browser 701, may be accessed by entering it's uniform resource locator (URL) into an address box 801 (nonfunctional sample URL displayed as an example), causing update website 121, to display as shown [act 2010]. Web page 8 may be utilized by a user to view one or more of the most recent speech command records 610, stored in database 505 connected to update website 121 [act 2015].

Three examples of a speech command record such as speech command record 610 are displayed. They are identified by their relative position as the top speech command record 806 (top row of fields), middle speech command record 807 (middle row of fields), and bottom speech command record 808 (bottom row of fields), as identified on the right side of FIG. 8. For illustrative purposes of the present invention, field headings 805 of exemplary speech command records 806, 807, 808 are displayed.

The fields of the top speech command record 806 are numbered for ease of reference. Hyperlinks related to the top speech command record 806 are also displayed in the same row. Each field in the top speech command record 806 may be linked. The fields and hyperlinks in the top speech command record 806 may be representative of how any other speech command records 610 may be displayed.

Zero, one or more speech command records 610 such as exemplary speech command records 806, 807, 808 may be displayed, where each speech command record 610 may have different data in their various fields.

Displayed linked fields and hyperlinks of top speech command record 806 may include: edit hyperlink 809, delete hyperlink 810, demographic view hyperlink 811, speech command displayed text 812 field, search type 813 field, speech command type 815 field, speech command 817 field, placeholder pattern 819 field, and query term separator 821 field.

The demographic view hyperlink 811, may be activated to display a new dialog. Zero, one or more records of demographic information linked to top speech command record 806, may be displayed in the new dialog.

Clicking a delete hyperlink, such as delete hyperlink 810, may cause the complete top speech command record 806, to be entirely deleted. A delete hyperlink in the row of any speech command record such as top speech command record 806, middle speech command record 807, or other speech command record 610, may perform the same action in it's respective row.

A user may decide [act 2020] to add, modify or delete a speech command record 610.

Processing [act 2025] to add, modify, or delete, a speech command record 610 may begin with a user clicking on an edit hyperlink, such as edit hyperlink 809, displayed in the top speech command record 806. Clicking an edit hyperlink such as edit hyperlink 809 may cause a top speech command record 806 to change to edit mode, changing its visual appearance so that it displays data in editable text boxes. Bottom speech command record 808 illustrates this by displaying a speech command record that is already in edit mode. A speech command record in edit mode such as speech command record 808 may display: an update hyperlink 823, a cancel hyperlink 825, a delete hyperlink 822, a demographic view hyperlink 826, a speech command displayed text box 827, a search type text box 829, a speech command type text box 831, a speech command text box 833, a placeholder pattern 835 text box, a query term separator 837 text box.

A user may enter text into a text box. A user may change text in a text box.

User may click cancel hyperlink 825 to cancel all changes input to text boxes, before they are saved.

User may click update hyperlink 823 to save any changes via update website 121 in server 120, to database 505.

A user may click button 804 to open a web page to add a speech command record 610 into a database 505, via update website 121 in server 120.

Figure 9:
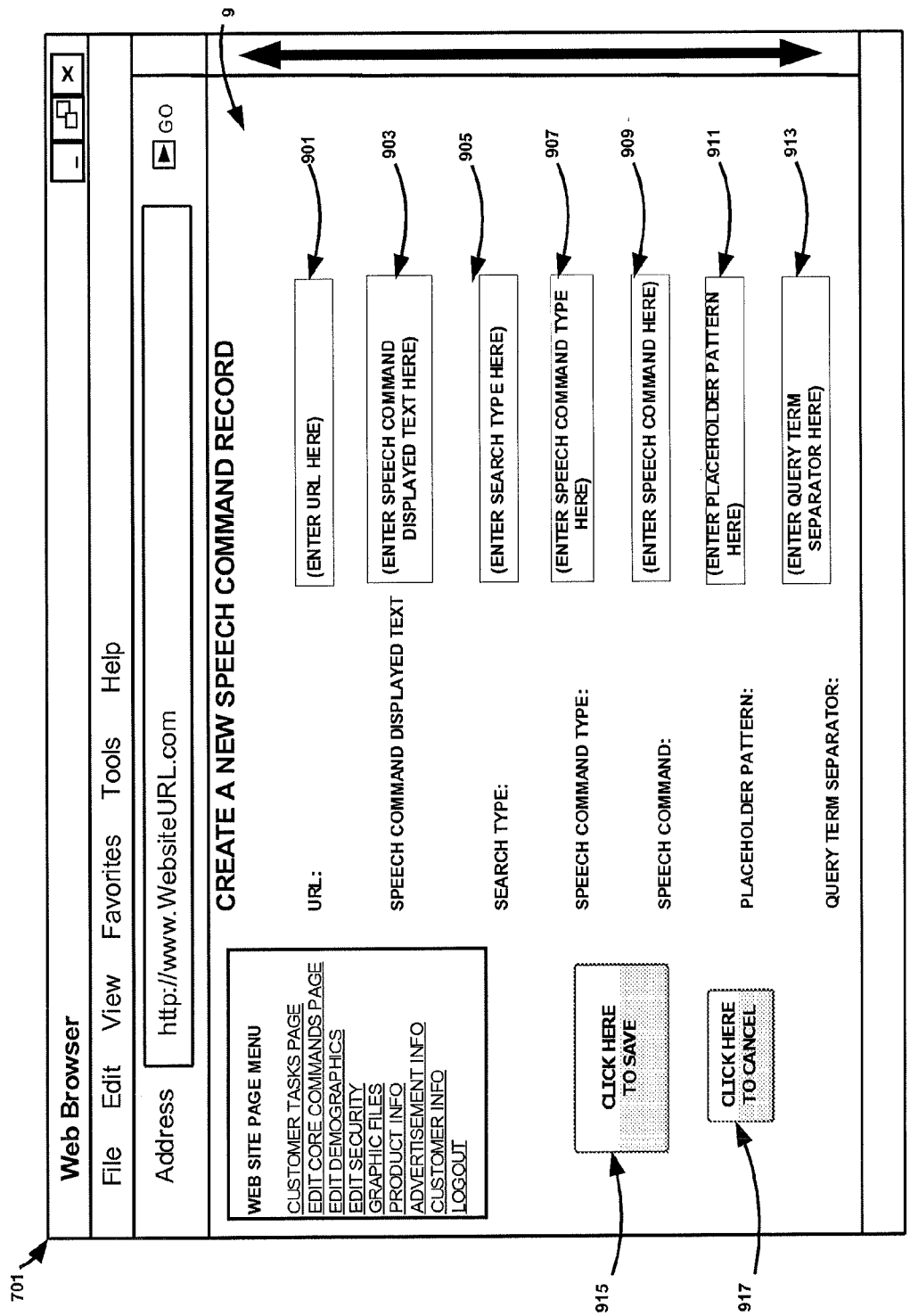

In FIG. 9, web page 9 in web browser 701 displayed from update website 121, may be utilized by a user to create a new speech command record 610 in database 505. A user may enter a speech command displayed text, into text box 903. A user may enter a uniform resource locator (URL), into text box 901. A user may enter a search type, into text box 905. A user may enter a speech command type, into text box 907. A user may enter a speech command, into text box 909. A user may enter a placeholder pattern, into text box 911. A user may enter a query term separator, into text box 913. A may click button 917 to cancel data entry. A User may click button 915 to cause the entered data to be linked as a record and stored in database 505.

Figure 10:
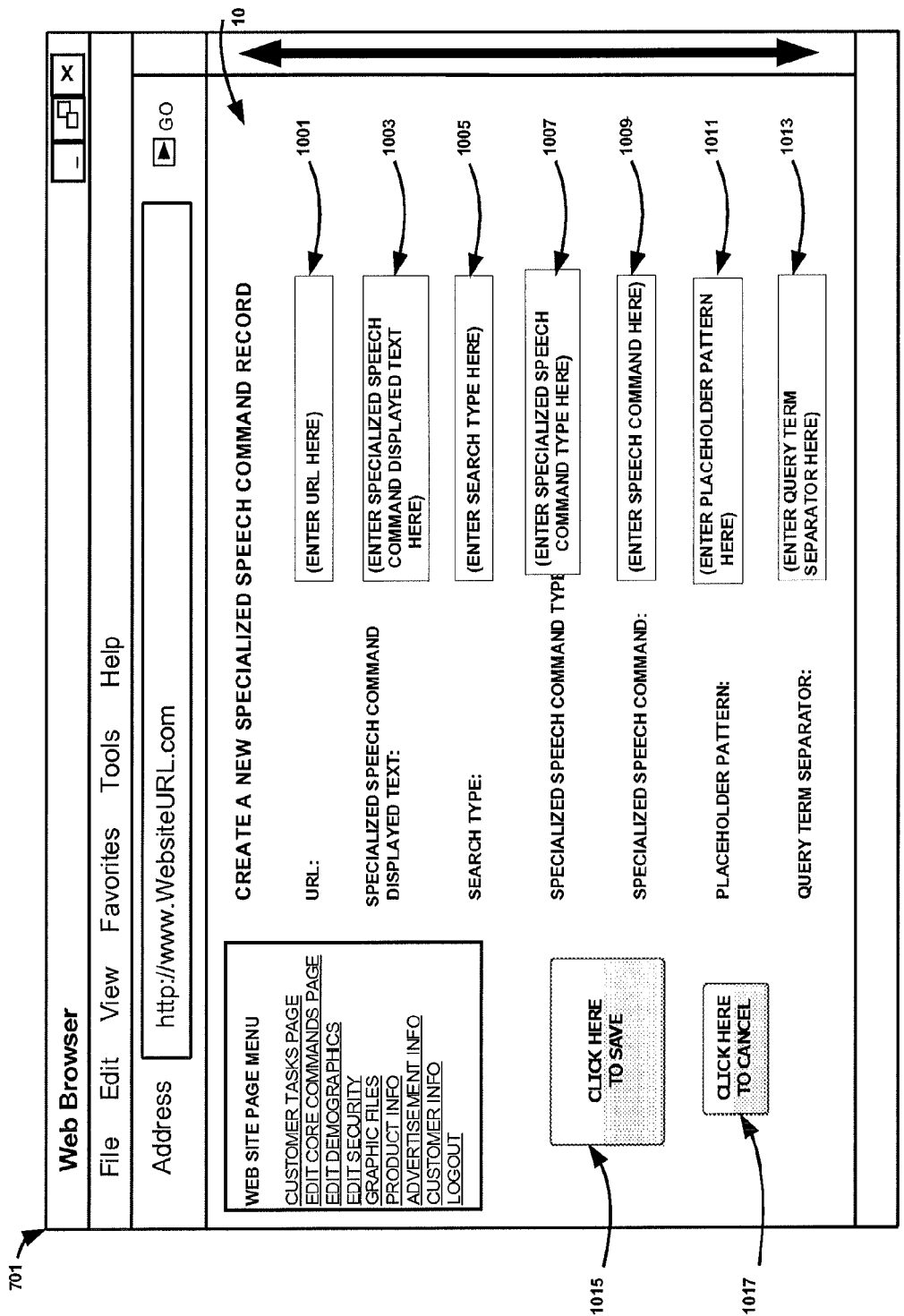

In an implementation consistent with the present invention, as illustrated in FIG. 10, web page 10 in web browser 701 displayed from update website 121 in server 120, may be utilized by a user to create a new specialized speech command record 620 in database 505. A user may enter a specialized speech command displayed text, into text box 1003. A user may enter a uniform resource locator (URL), into text box 1001. A user may enter a search type, into text box 1005. A user may enter a specialized speech command type, into text box 1007. A user may enter a specialized speech command, into text box 1009. A user may enter a placeholder pattern, into text box 1011. A user may enter a query term separator, into text box 1013. A User may click button 1017 to cancel data entry. User may click button 1015 to cause the entered data to be linked as a record and stored in the database 505.

In an implementation consistent with the present invention, a new web page similar in form and function to the web page 8 appearing in FIG. 8, may be added into update website 121 in server 120, specifically for viewing, editing, adding, and deleting, specialized speech command records 620 (previously shown on FIG. 6C). Zero, one or more specialized speech command records 620 may be displayed on such a web page.

Figure 11:
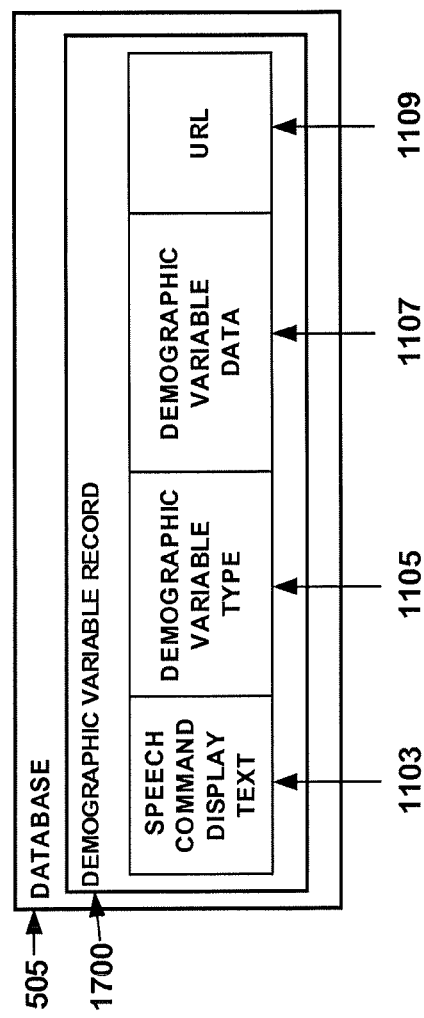

In FIG. 11, demographic variable data 1107 may be defined as data describing population characteristics. Demographic information traditionally has been used by marketers and economists to create market segments. FIG. 11 illustrates a demographic variable record 1100 that may be stored in a database 505. A demographic variable record 1100 may include speech command displayed text 1103, demographic variable type 1105, demographic variable data 1107, uniform resource locator (URL) 1109. The contents of a demographic variable record 1100 may be linked. Demographic variable records 1100 may be linked to a speech command record 610, or to a specialized speech command record 620. Demographic variable records 1100 may be linked to other fields. Demographic variable records 1100 may be utilized to segment any of speech command records 610 and specialized speech command records 620 into separate market segments. In an implementation consistent with the present invention, a demographic variable record 1100 may include one or more data fields.

In an implementation consistent with the present invention, zero, one, or more demographic variable records 1100, may be stored in a database 505. In another implementation consistent with the present invention, a demographic variable record 1100 may include one or more data fields.

Demographic variable data 1107 which may be linked to a speech command record 610 or specialized speech command record 620 may be categorized by demographic variable types 1105. Demographic variable types 1105 may include:
Zip—may be used to categorize a user's zip code;
Age—may be used to categorize a user's age;
Sex—may be used to categorize a user's sex;
Email—may be used to categorize a user's email;
State—may be used to categorize a user's state;
Country—may be used to categorize a user's country;
Language—may be used to categorize a language of an installed speech recognition program (e.g. 'English', 'French', etc.);
All—may be used to categorize as a custom demographic variable type.

Figure 12:
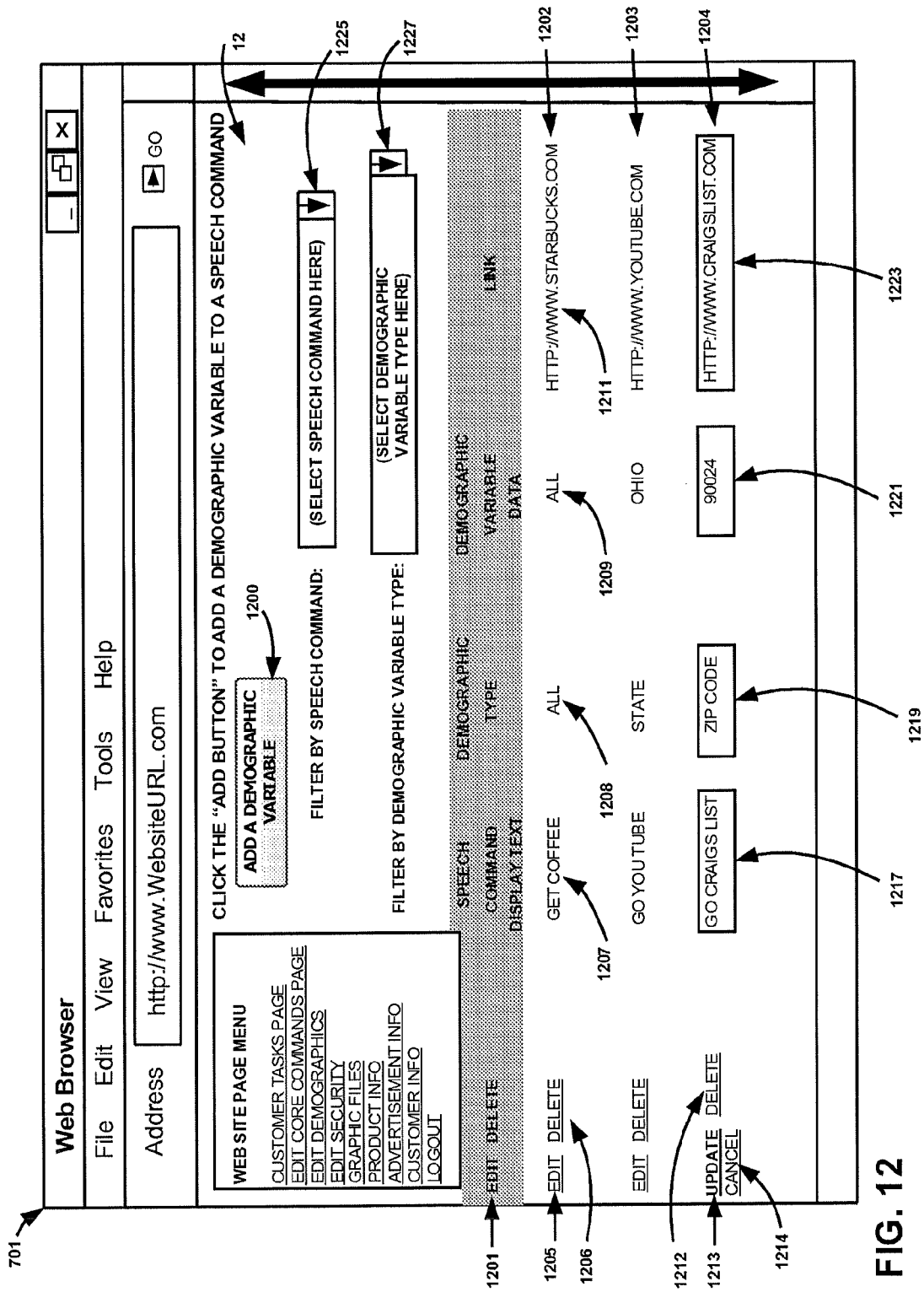

In FIG. 12, web page 12 in web browser 701 displayed from update website 121 in server 120, may be utilized by a user to view, add, modify, or delete demographic variable records 1100.

For illustrative purposes of the present invention, in FIG. 12, three different examples of a demographic variable record 1100 are displayed. They are identified by their relative position as the top demographic variable record 1202 (top row of fields), middle demographic variable record 1203 (middle row of fields), and bottom demographic variable record 1204 (bottom row of fields). For further illustrative purposes of the present invention, field headings 1201 are displayed for demographic variable records 1202, 1203, and 1204.

The top demographic variable record 1202 is numbered to identify fields that may be displayed in a web page 12. Hyperlinks related to the top demographic variable record 1202 are also numbered and displayed in the same row.

Each field in top demographic variable record 1202 may be linked. The fields and hyperlinks in the top demographic variable record 1202 are representative of how any other demographic variable records 1100, such as exemplary demographic variable records 1202, 1203, 1204 may be displayed on a web page 12. An unlimited number of demographic variable records 1100 may be displayed, where each may have different data in it's fields.

Multiple demographic variable records 1100 may be linked to a single speech command record 610 and/or specialized speech command record 620, and/or other data.

Displayed linked fields and hyperlinks may include: edit hyperlink 1205, delete hyperlink 1206, speech command 1207 field, demographic variable type 1208 field, demographic variable data 1209 field, and link 1211 field.

Clicking the delete hyperlink 1206, may cause the top demographic variable record 1202 to be entirely deleted. A delete hyperlink in the row of any demographic variable record such as top demographic variable record 1202, middle demographic variable record 1203, or other demographic variable record 1100 may perform the same action in it's respective row.

Processing [act 2025] to add, modify, or delete, a demographic variable record 1100 may begin with a user clicking on an edit hyperlink, such as edit hyperlink 1205, as displayed in the top demographic variable record 1202. Clicking an edit hyperlink such as edit hyperlink 1205 may cause a demographic variable record 1100 such as top demographic variable record 1202 to change to edit mode, changing its visual appearance so that it displays data in editable text boxes. Bottom demographic variable record 1204 illustrates this by displaying a demographic variable record 1100 that is already in edit mode. A demographic variable record 1100 in edit mode such as bottom demographic variable record 1204 may display: a delete hyperlink 1212, an update hyperlink 1213, a cancel hyperlink 1214, a speech command text box 1217, a demographic type text box 1219, a demographic variable data text box 1221, a link text box 1223.

A user may enter text into a text box. A user may change text in a text box.

User may click cancel hyperlink 1214 to cancel all changes input to text boxes before they are saved.

User may click update hyperlink 1213 to save any changes via update website 121 in server 120, to database 505.

Web page 12 in web browser 701 may be able to filter all demographic variable records 1100 in a database 505, by speech command 614. A user may choose a speech command 614 linked to a speech command record 610, from a menu such as filter by speech command drop down menu 1225. This may cause update website 121 in server 120 to display all demographic variable records 1100 linked to the speech command record 610 which may be linked to the chosen speech command 614.

Web page 12 in web browser 701 may be able to filter all demographic variable records 1100 in a database 505, by demographic variable type 1105. A user may choose a demographic variable type 1105 from a menu such as, filter by demographic variable type drop down menu 1227, which may cause update website 121 in server 120 to display all demographic variable records 1100 linked to the chosen demographic variable type 1105.

In an implementation consistent with the present invention, other filters may be added to web page 12.

In an implementation consistent with the present invention, demographic variable records 1100 may be linked to a specialized speech command record 620. Demographic variable records 1100 linked to specialized speech command records 620, may be filtered and displayed.

A user may click button 1200 to open a web page, to add a demographic variable record 1100 to a speech command record 610.

Figure 13:
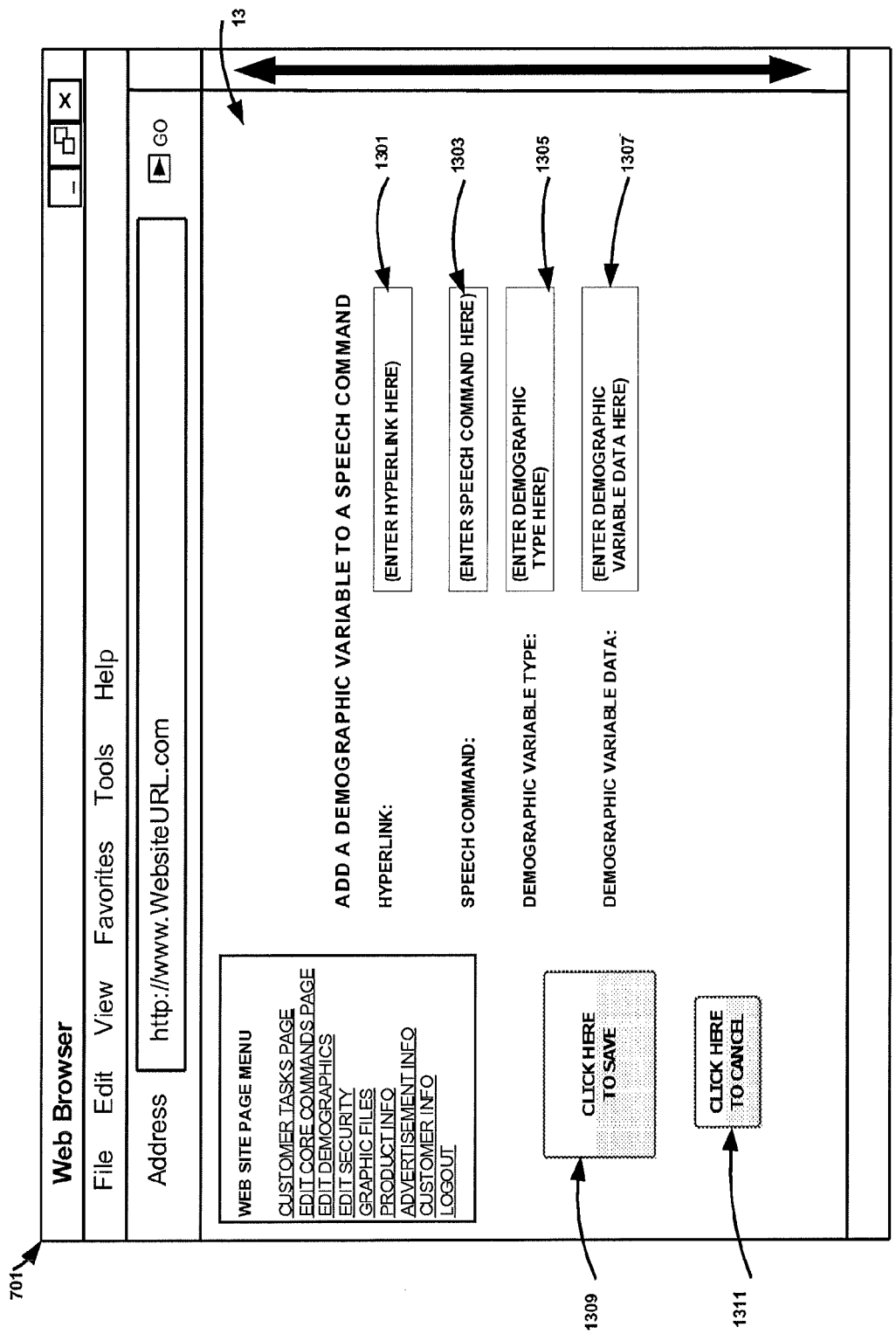

In FIG. 13, web page 13 in web browser 701 displayed from update website 121 in server 120, may be utilized by a user to add demographic variable record 1100 to a speech command record 610 [act 2025].

A user may enter a speech command 614, into text box 1303. A user may enter a hyperlink, into text box 1301. A user may enter a demographic variable type, into text box 1305. A user may enter demographic variable data, into text box 1307. In the event user decides not to save the input data, user may click button 1311 to cancel data entry. In the event user decides to save the input data, user may click button 1309 that may cause the entered data to be linked as a record and stored in the database 505. A web page similar to web page 13 may be added to update website 121 in server 120 to add a demographic variable record 1100 to a specialized speech command record 620.

Figure 14:
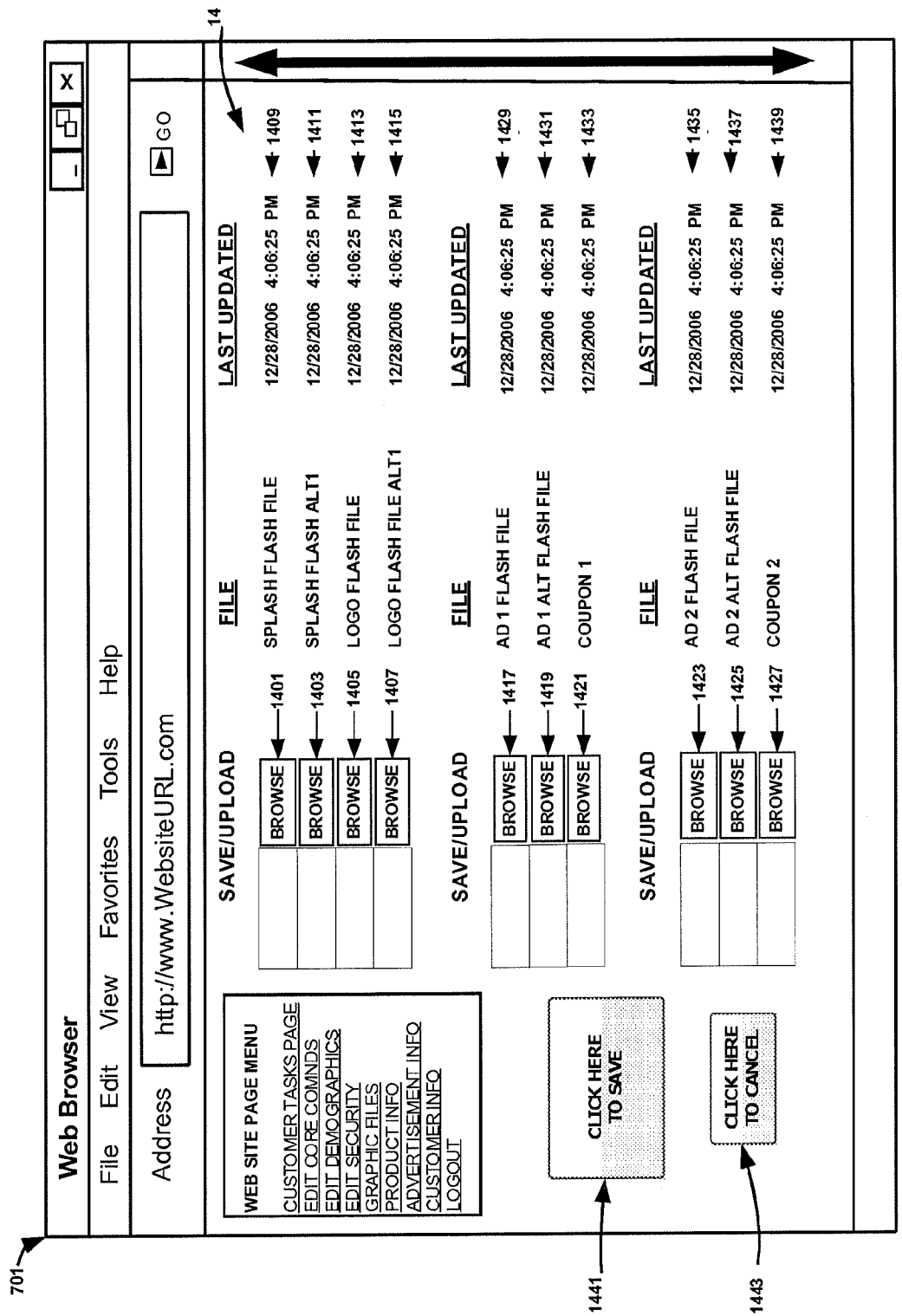

In FIG. 14, web page 14 in web browser 701 displayed from update website 121 in server 120, may be utilized by a user to update and save in a database 505, multimedia and advertisement file location information, of multimedia and advertisement files that may be loaded and displayed in a speech recognition program 401 in client device 101 [act 2025]. Multimedia and advertisement files that may be displayed by a speech recognition program 401 may include: flash files, graphics files, or other multimedia files for a splash page; flash files, graphics files, or other multimedia files that may be used for a logo; flash files, graphics files, or other multimedia files for any advertisements; other flash files, other graphics files, or other multimedia files that may be update-able.

In FIG. 14, a user may view the date-time a link was last updated by looking in locations 1409, 1411, 1413, 1415, 1429, 1431, 1433, 1435, 1437, and 1439.

The user may click the browse button 1401 to identify a splash page flash file to upload. The user may click the browse button 1403 to identify a splash page alternate file to upload. The user may click the browse button 1405 to identify a logo flash file to upload. The user may click the browse button 1407 to identify a logo alternate file to upload. The user may click the browse button 1417 to identify an ad 1 flash file to upload. The user may click the browse button 1419 to identify an ad 1 alternate file to upload. The user may click the browse button 1421 to identify a coupon 1 file to upload. The user may click the browse button 1423 to identify an ad 2 flash file to upload. The user may click the browse button 1425 to identify an ad 2 alternate file to upload. The user may click the browse button 1427 to identify a coupon 2 file to upload. Clicking any of the browse buttons 1401, 1403, 1405, 1407, 1417, 1419, 1421, 1423, 1425, 1427, may cause a browse dialog to appear. A user may utilize the browse dialog in a well known manner to find a file and save the file's name in the text box beside the browse button.

In an implementation consistent with the present invention, web page 14 may provide upload, edit and save capabilities for any number of advertisements, logos, splash files, or other files, dependent upon the requirements of the speech recognition program 401 in client device 101.

User may click button 1443 to cancel inputs to this page before saving them.

User may click button 1441 to save inputs to this page, to database 505, via update website 121 in server 120.

Figure 15:
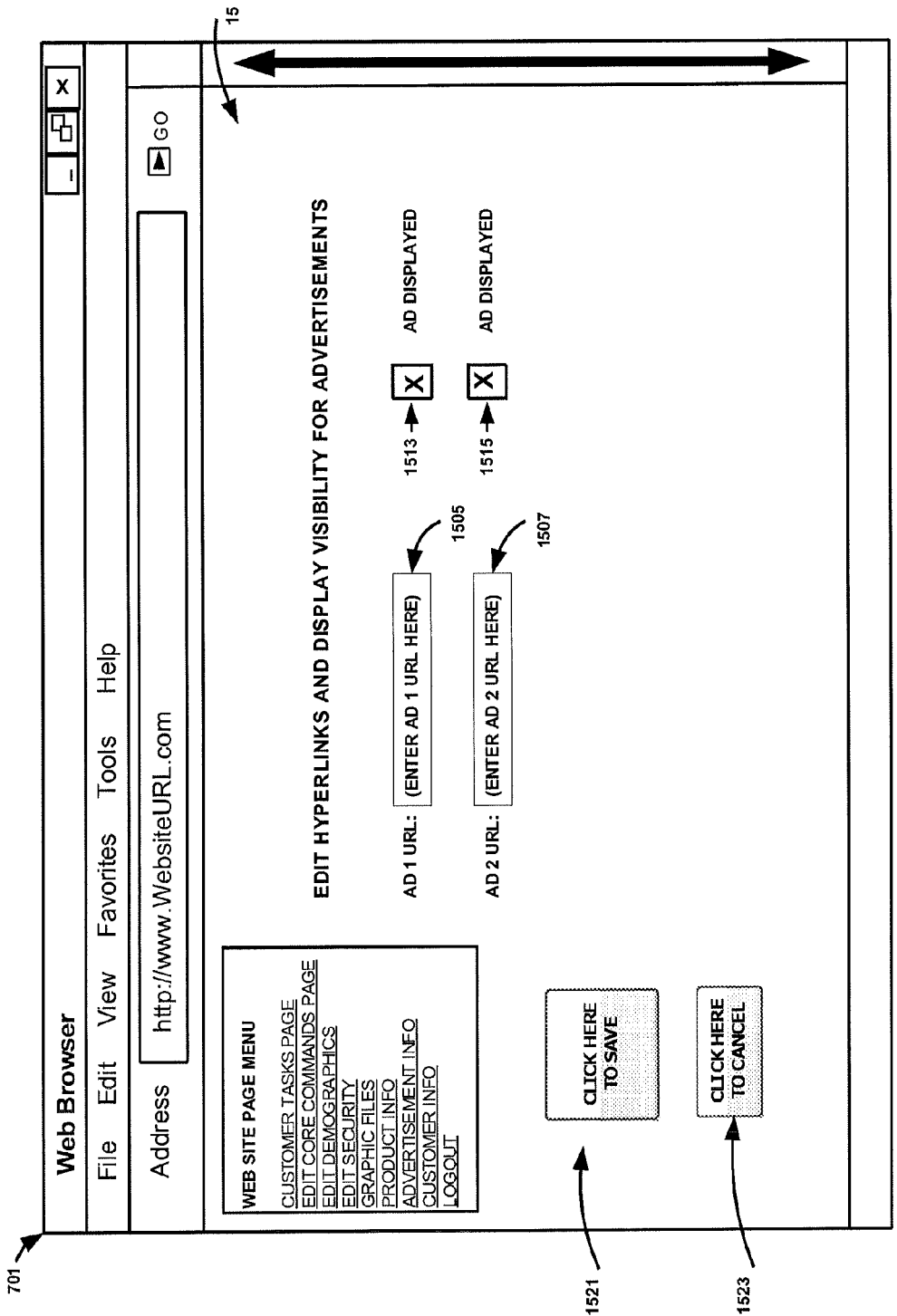

In FIG. 15, web page 15 in web browser 701 displayed from update website 121 in server 120, may be utilized by a user to edit and save an advertisement hyperlink [act 2025]. An advertisement hyperlink, may be a hyperlink, that may be linked to a displayed ad in the speech recognition program 401. A user of a speech recognition program 401 may be able to click a displayed ad in speech recognition program 401 and may be directed to a web page for that displayed ad.

A user may enter a hyperlink for ad 1 in text box 1505. A user may enter a hyperlink for ad 2 in text box 1507.

User may control if any of the advertisement files that may be downloaded by a speech recognition program 401, are displayed when a speech recognition program 401, is loaded by a client device 101.

User may place a check in check box 1513, to display any of the ad 1 files downloaded. Unchecked check box 1513 will cause ad 1 files not to load into speech recognition program 401. User may place a check in check box 1515, to display any of the ad 2 files downloaded. Unchecked check box 1515 will cause ad 2 files not to load into speech recognition program 401. A check box may be displayed for each ad displayed on web page 15 of update website 121. One or more advertisement hyperlinks may be displayed with related check boxes, on a web page 15.

User may click button 1523 to cancel inputs to this page before saving it.

User may click button 1521 to save inputs to database 505.

Figure 16:
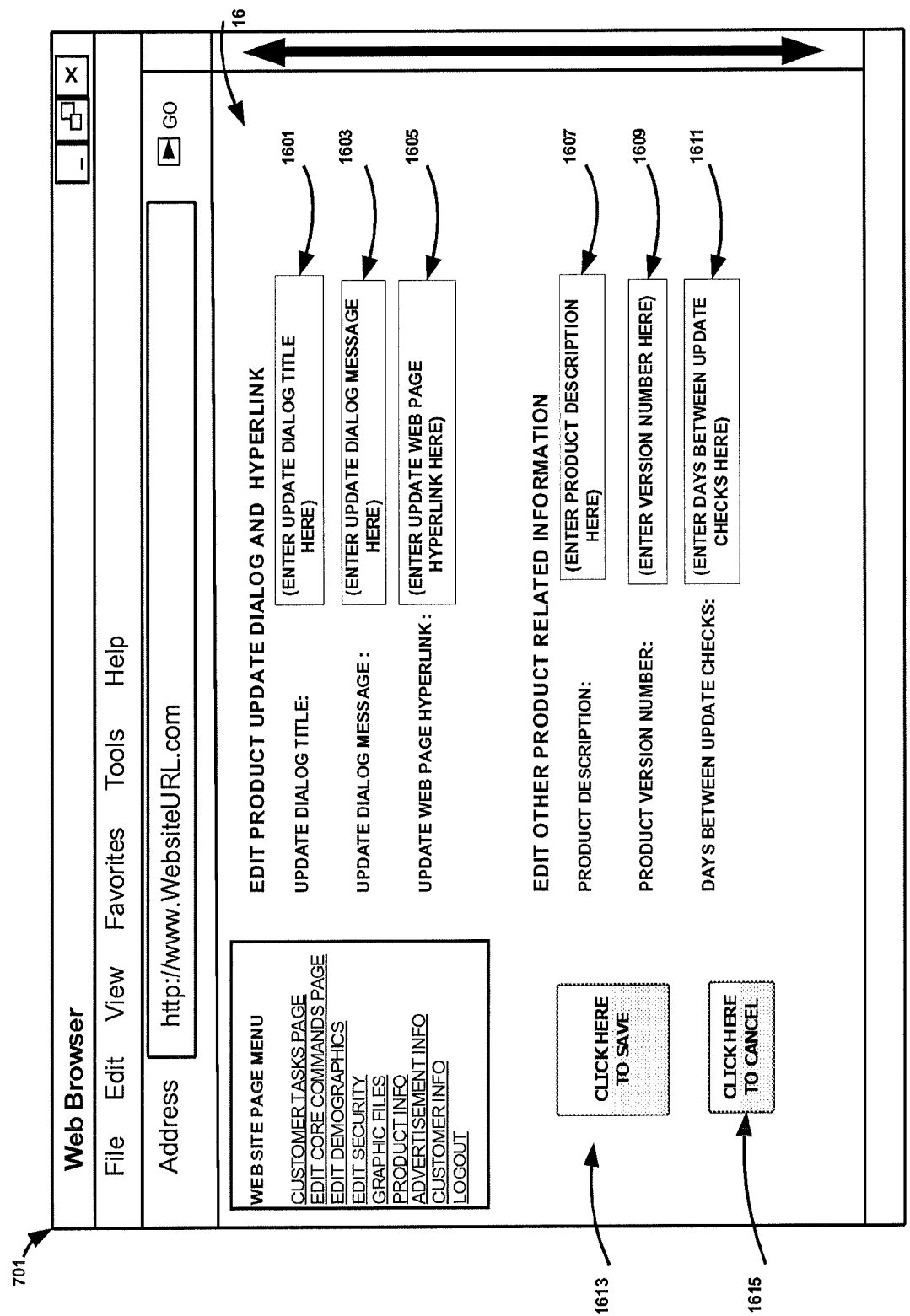

In FIG. 16, web page 16 in web browser 701 displayed from update website 121 in server 120, may be utilized by a user to edit messages that may appear in a dialog of a speech recognition program 401 [act 2025]. The dialog may notify a user of an update being available.

A user may enter text in update dialog title text box 1601, that may update a title bar in a dialog that may display when speech recognition program 401 may be running. A user may enter text in update dialog message text box 1603 that may update a message in a dialog that may display when speech recognition program 401 may be running. A user may enter a hyperlink in hyperlink text box 1605 that may update a hyperlink appearing in a dialog that may display when speech recognition program 401 may be running. The hyperlink may link to a web page where a new version or edition of a speech recognition program 401 may be available to be downloaded into a client device 101.

In addition a user may edit [act 2025] product related information about a speech recognition program 401. A user may enter a product description into product description text box 1607. A user may enter a product version number into product version number text box 1609. A user may enter a number of days into, days between update checks text box 1611.

User may click button 1615 to cancel inputs to this page before saving it.

User may click button 1613 to save inputs to database 505. Speech recognition program 401 in a client device 101 may utilize any downloaded product related information to determine a future date to check for additional updates.

Figure 17:
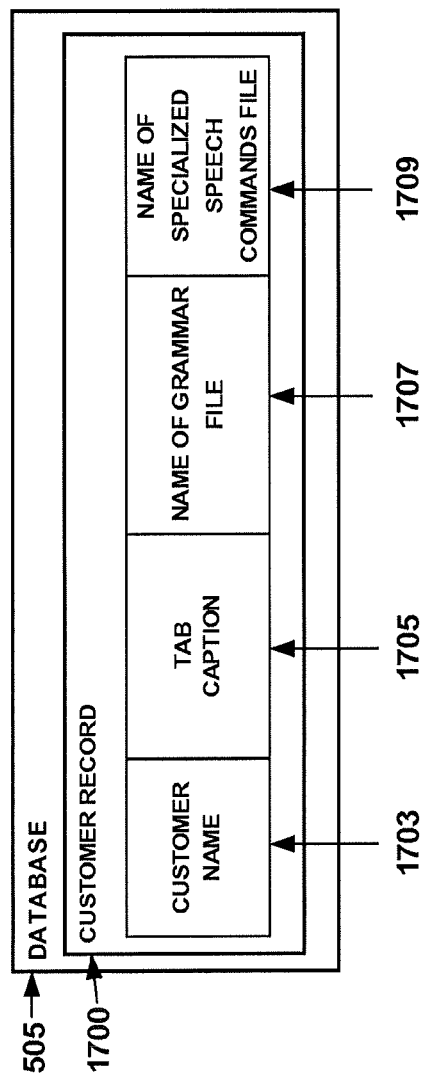

FIG. 17 illustrates a customer record 1700 that may be stored in a database 505. A customer record 1700 may include information relating to a particular customer. A customer record 1700 may include customer name 1703, tab caption 1705, name of grammar file 1707, name of specialized speech commands file 1709. The contents of a customer record 1700 may be linked.

Zero, one, or more customer records 1700, may be stored in a database 505.

In an implementation consistent with the present invention, customer record 1700 may include one or more data fields.

Figure 18:
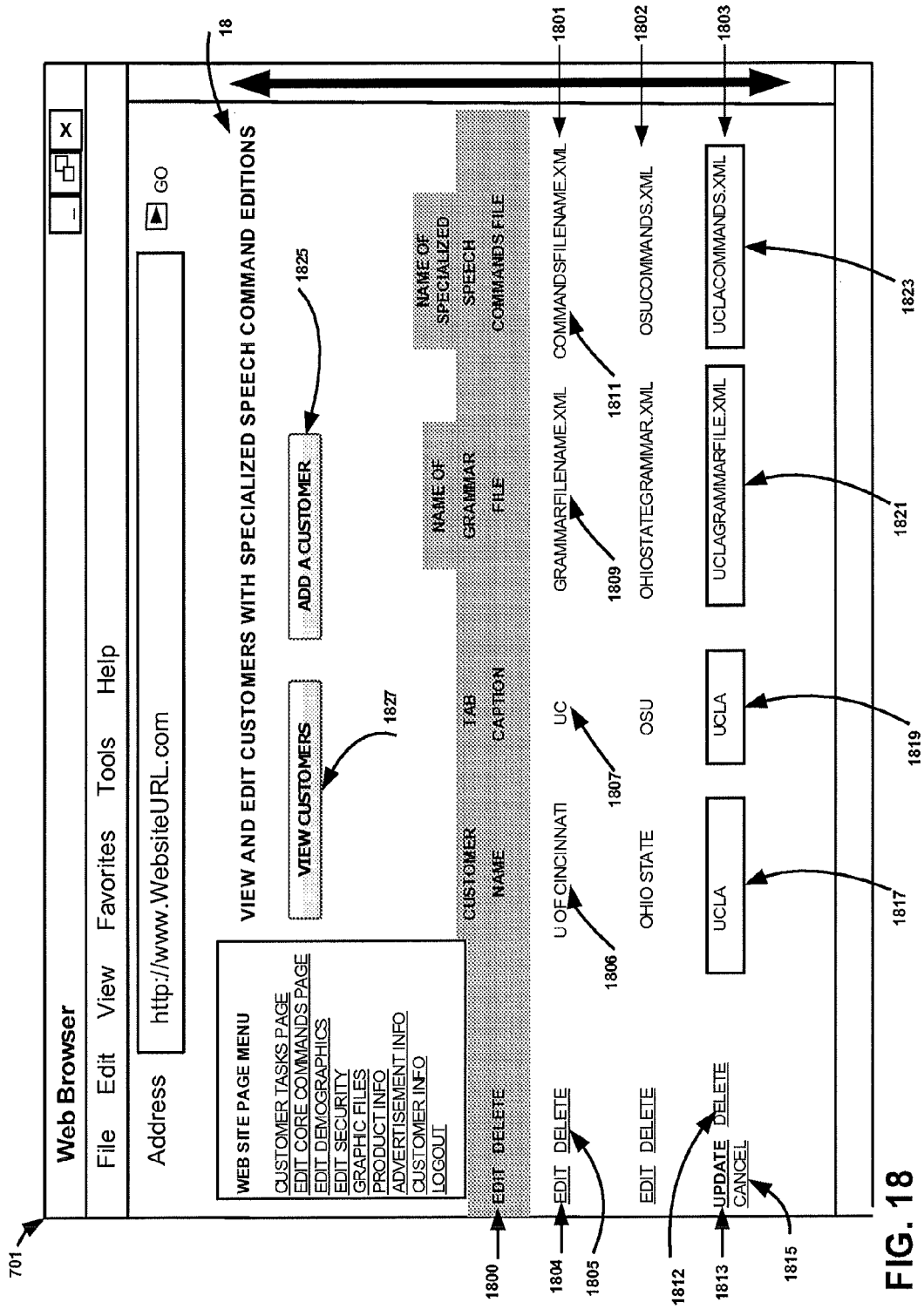

In FIG. 18, web page 18 of update website 121 in server 120, may be displayed in web browser 701 and may be utilized by a user to view the most recent customer records 1700 stored in database 505 [act 2015].

For illustrative purposes of the present invention, in FIG. 18, three examples of a customer record 1700 are displayed. They are identified by their relative position as the top customer record 1801 (top row of fields), middle customer record 1802 (middle row of fields), and bottom customer record 1803 (bottom row of fields), as identified on the right side of FIG. 18. For further illustrative purposes field headings 1800 of customer records 1801, 1802, 1803 are displayed.

The top customer record 1801 is labeled to identify the fields of top customer record 1801 that may be viewed on this web page 18 in update website 121. Hyperlinks related to the top customer record are also displayed in the same row. The fields and hyperlinks in the top customer record 1801 may be representative of how any other customer records 1700 may be displayed on this web page. Zero, one, or more customer records 1700 may be displayed, where each may have different data in their fields.

Clicking a delete hyperlink, such as delete hyperlink 1805, may cause the complete top customer record 1801, to be deleted. A delete hyperlink in the row of any customer record such as top customer record 1801, middle customer record 1802, or other customer records 1700 that may be displayed, may perform the same delete action in its respective row.

A user may decide [act 2020] to add, modify or delete customer name 1806, tab caption 1807, name of grammar file 1809, name of specialized speech commands file 1811 in a customer record 1700 such as the top customer record 1801.

Processing [act 2025] to add, modify, or delete, customer records 1700 such as exemplary customer records 1801, 1802 or other customer records 1700, may begin with a user clicking on an edit hyperlink, such as edit hyperlink 1804 displayed in the top customer record 1801. Clicking an edit hyperlink such as edit hyperlink 1804 may cause a customer record 1700 such as top customer record 1801 to change to edit mode, changing its visual appearance so that it displays data in editable text boxes. A customer record 1700 in edit mode such as bottom customer record 1803, may display: an update hyperlink 1813, a cancel hyperlink 1815, a delete hyperlink 1812, a customer name text box 1817, a tab caption text box 1819, a name of grammar file text box 1821, a name of specialized speech commands file text box 1823. A user may enter text into a text box. A user may change text in a text box.

User may click cancel hyperlink 1815 to cancel all changes input to text boxes, before they are saved. User may click update hyperlink 1813 to save any changes via update website 121 in server 120, to database 505.

A user may click button 1825 to open a web page to add a customer record 1700 to a database 505. A user may click on button 1827 to view a dialog showing all customer records 1700.

Figure 19:
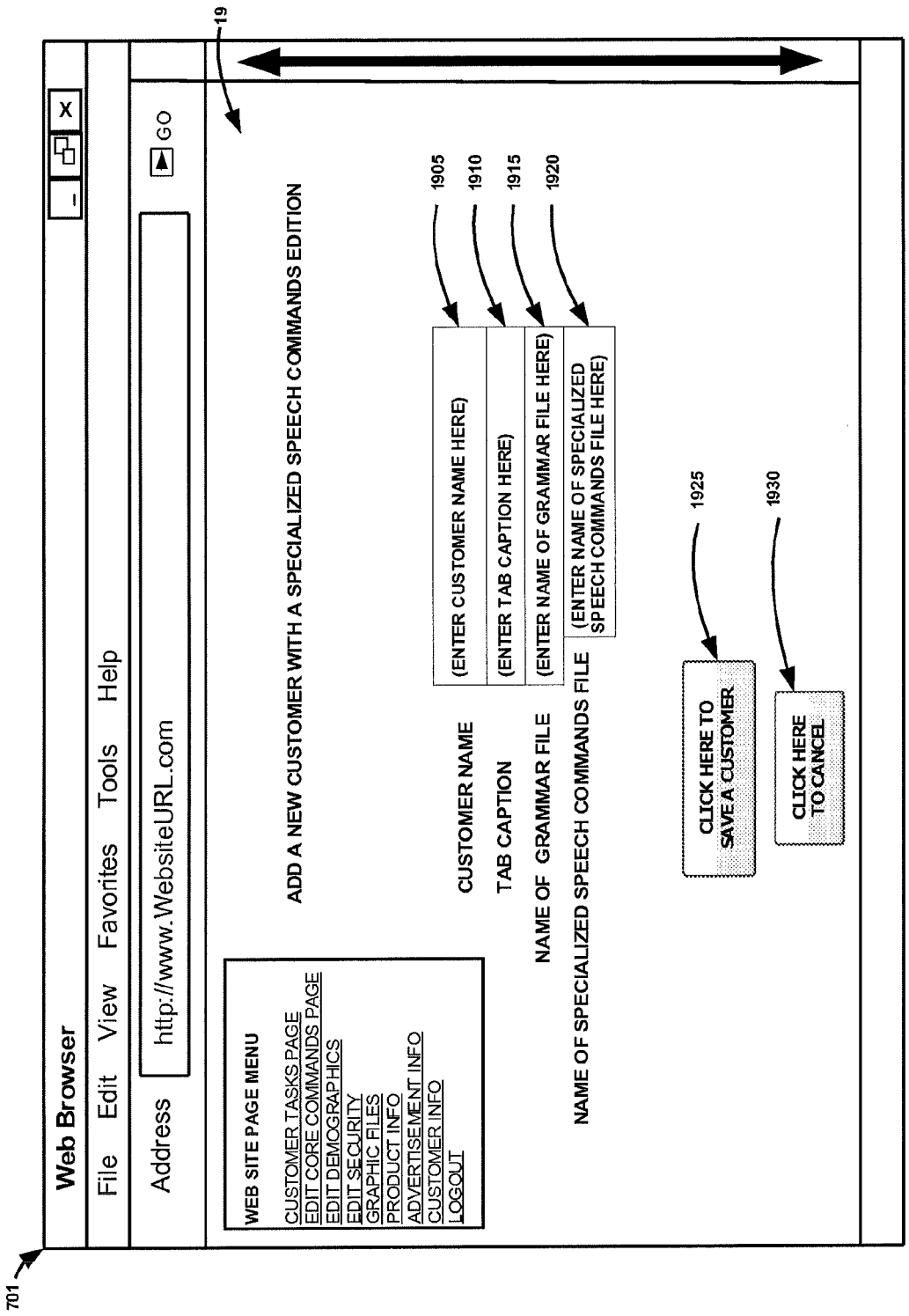
Figure 20:
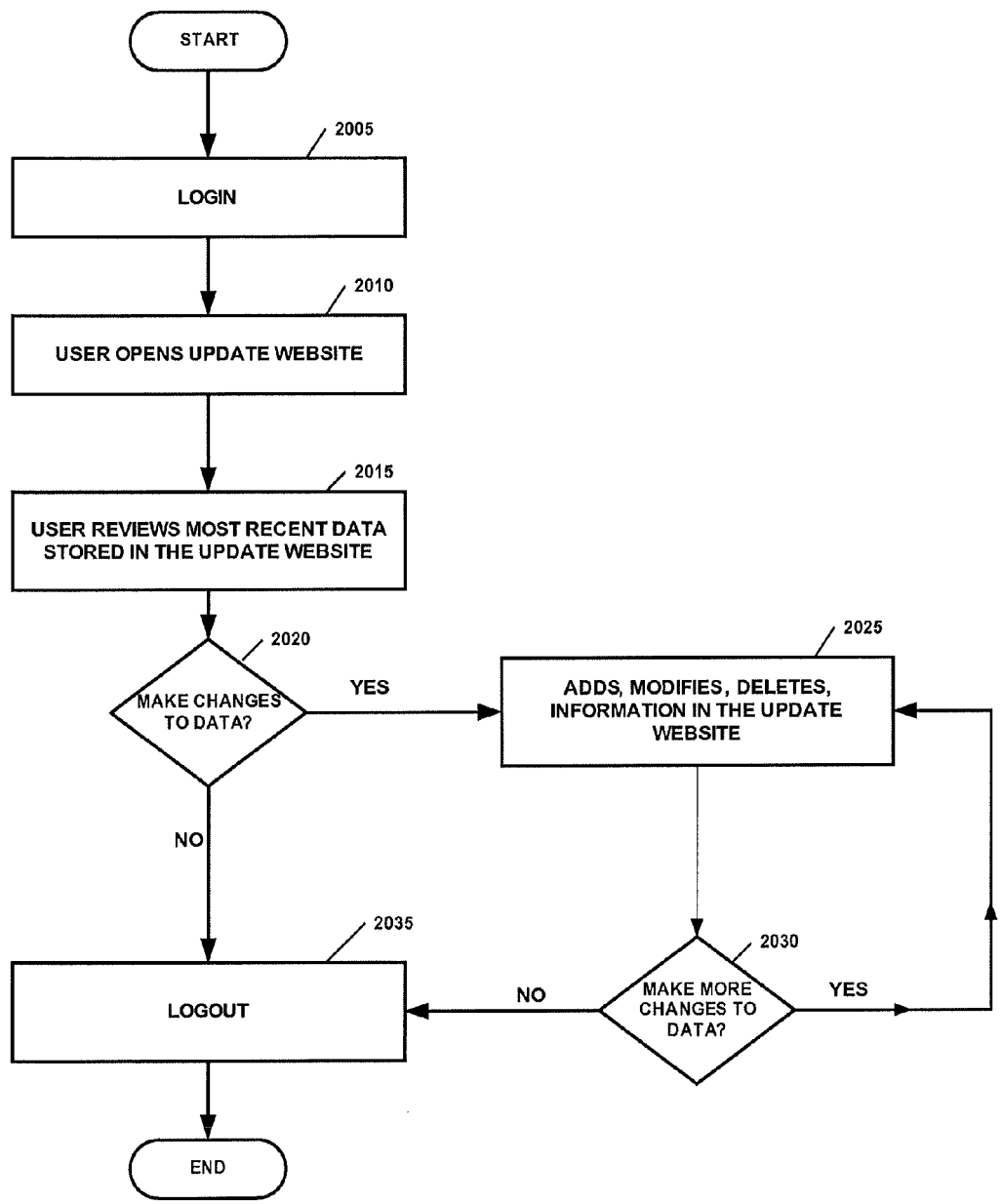
FIG. 20 illustrates an exemplary process consistent with the present invention, for a user to add, modify, or delete information in an update website.
Figure 21:
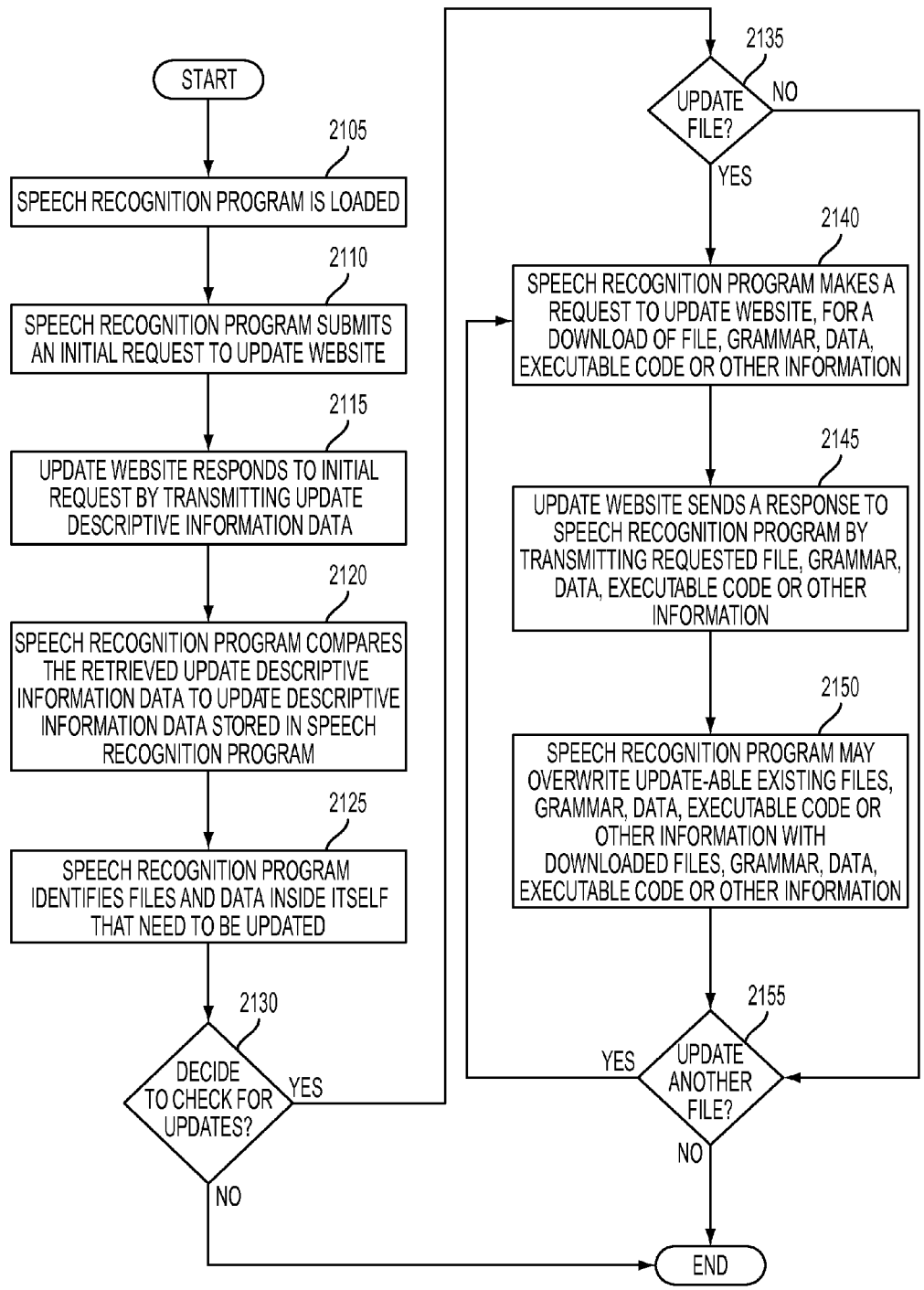
FIG. 21 illustrates an exemplary process consistent with the present invention, for a speech recognition program to be updated from an update website.

In FIG. 19, web page 19 in web browser 701 displayed from update website 121 in server 120, may be utilized by a user to create a new customer record. The user may enter a customer name into text box 1905. A user may enter a tab caption into text box 1910. A user may enter a name of a grammar file into text box 1915. A user may enter a name of specialized speech commands file into text box 1920. A user may click button 1930 that may cancel data entry. A user may click button 1925 that may cause the entered data to be linked as a record and stored in the database 505, via update website 121 in server 120.

After making changes in database 505, via update website 121 in server 120, user may re-view any of the web pages displayed to determine if additional changes need to be made [act 2030].

A user may logout [act 2035] from update website 121 in server 120

In an implementation consistent with the present invention, additional web pages may be added to update website 121.

In an implementation consistent with the present invention, zero, one or more fields may appear in a web page in update website 121.

In an implementation consistent with the present invention, boxes, text, and functionalities of web pages of update website 121 may be moved to different web pages of update website 121, and may be displayed in various different formats.

Updates saved to database 505 may be available to be downloaded via the update website 121, into a speech recognition program 401 in client device 101.

Exemplary Update Download Processing

Referring again to FIG. 5, illustrated is an exemplary process, consistent with the present invention, for performing an update of files, grammar file, data, executable code, and other information, in a speech recognition program 401 in a client device 101. In an implementation consistent with the present invention, a client device, such as client device 101, along with a server 120, may perform this process. It will be appreciated, however, that one or more, client devices 101, servers 120, or servers 130 may alternatively perform the entire process or part of the process described below.

Processing may begin with a client device such as client device 101 loading [act 2105] a speech recognition program 401.

(A) Speech recognition program 401 in client device 101 may submit an initial request [act 2110] to update website 121 in server 120, in a well known transmission manner over a network 140. The request may be for update descriptive information data about files, grammar file, data, executable code, and/or other information, available for update from update website 121 in server 120. Update descriptive information data may include the date-times that files, grammar file, data, executable code, and/or other information, were last modified.

Speech recognition program 401 in client device 101 may, as a part of an initial request, provide demographic variable data 1107 and self-identifying descriptive information, to update website 121 in server 120. Demographic variable data 1107 may be categorized by demographic variable type 1105. Self-identifying descriptive information may be categorized by self-identifying descriptive information type. Demographic variable data 1107 may be provided by a user or a speech recognition program 401 in client device 101. Self-identifying descriptive information may be provided by a speech recognition program 401 in client device 101

Examples of demographic variable types 1105, and demographic variable data 1107 that may be categorized by demographic variable types 1105, may include:

Zip—may be a user's zip code;
Age—may be a user's age;
Sex—may be a user's sex;
Email—may be a user's email;

State—may be a user's state;
Country—may be a user's country;
Language—may be a text description of the language of an installed speech recognition program 401 (e.g. 'English', 'French' etc.).

Examples of self-identifying descriptive information types, and self-identifying descriptive information data that may be categorized by self-identifying descriptive information types, may include:

Version—numeric release version number (e.g. 2.5, 2.0.1 etc.) of an installed speech recognition program 401;
Edition—text description of product edition (e.g. 'Free' or 'Premium') of an installed speech recognition program 401;
Id—unique identifier of a particular installation of a speech recognition program 401, that may be generated during first run of a speech recognition program 401, and may comprise random characters plus a date time stamp;
Productid—unique identifier of a speech recognition program 401, that may be recognized by a server and may be stored in a database or some type of data storage (For example, Free Version 2.5 may have a Productid value of 2, Premium Version 2.5 may have a Productid value of 3);
Customername—a text description of a speech recognition program 401, that may denote that speech recognition program 401 is for a specific customer (For example, a speech recognition program 401 may have a Customername of "UC" to denote the University of California.)

Update website 121 in server 120 may save in a database 505, demographic variable data 1107, and self-identifying descriptive information data received in a request from speech recognition program 401.

(B) Update website 121 in server 120 may respond [act 2115] to speech recognition program 401 in client device 101. Update website 121 may transmit to speech recognition program 401, update descriptive information data about files, grammar file, data, executable code, and/or other information available for update from update website 121 in server 120. Update descriptive information data may be categorized by update descriptive information type. Update descriptive information data that may be returned in a response by an update website 121, may be dependent upon the demographic variable data 1107, and self-identifying descriptive information data received in the initial request from speech recognition program 401 in client device 101.

Examples and short descriptions of update descriptive information types may include:

SNewVersionTitle—title displayed in a 'New Version Available' dialog in speech recognition program 401. Dialog is only displayed if there is a newer version of the speech recognition program 401 available for download;
SNewVersionMsg—message displayed in a 'New Version Available' dialog in speech recognition program 401. Dialog is only displayed if there is a newer version of the speech recognition program 401 available for download;
SNewVersionlink—URL hyperlink that may appear in a 'New Version Available' dialog box that may appear in a speech recognition program 401. If a user wants to download a newer version of a speech recognition program 401, they may click this hyperlink. Dialog is only displayed if there is a newer version of the speech recognition program 401 available for download;
SDaysBetweenUpdates—may be the number of days that must elapse until speech recognition program 401 will again check for updates;
sShowAd1—show ad 1 indicates whether to show ad 1;
sShowAd2—show ad 2 indicates whether to show ad 2;
sShowAd3—show ad 3 indicates whether to show ad 3;
sShowAd4—show ad 4 indicates whether to show ad 4;
sCouponUrl1—defines what happens when user clicks on an ad 1;
sCouponUrl2—defines what happens when user clicks on an ad 2;
sCouponUrl3—defines what happens when user clicks on an ad 3;
sCouponUrl4—defines what happens when user clicks on an ad 4;
sNewVersion—Version number that may signal speech recognition program 401 that there may be a new version of speech recognition program 401 available for download;
sLastModifiedVc—date-time speech command records 610 were last updated on an update website 121;
sLastModifiedVcClient—date-time specialized speech command records 620 were last updated on an update website 121;
sLastModifiedDll—date-time a new dll was last uploaded to an update website 121;
sLastModifiedAd1—date-time a multimedia file was last uploaded for ad 1, to an update website 121;
sLastModifiedAd2—date-time a multimedia file was last uploaded for ad 2, to an update website 121;
sLastModifiedAd3—date-time a multimedia file was last uploaded for ad 3, to an update website 121;
sLastModifiedAd4—date-time a multimedia file was last uploaded for ad 4, to an update website 121;
sLastModifiedAd1_alt—date-time an alternative graphic was uploaded for ad 1;
sLastModifiedAd2_alt—date-time an alternative graphic was uploaded for ad 2;
sLastModifiedAd3_alt—date-time an alternative graphic was uploaded for ad 3;
sLastModifiedAd4_alt—date-time an alternative graphic was uploaded for ad 4;
sLastModifiedCoupon1—date-time a graphic for coupon 1 was uploaded for ad 1;
sLastModifiedCoupon2—date-time a graphic for coupon 2 was uploaded for ad 2;
sLastModifiedCoupon3—date-time a graphic for coupon 3 was uploaded for ad 3;
sLastModifiedCoupon4—date-time a graphic for coupon 4 was uploaded for ad 4;
sLastModifiedSplash—date-time a multimedia file for a splash page was uploaded;
sLastModifiedSplash_alt—date-time an alternative graphic for a splash page was uploaded;
sLastModifiedLogo—date-time a multimedia file for a speech recognition program's 401 control window was uploaded;
sLastModifiedLogo_alt—date-time an alternative graphic for a speech recognition program's 401 control window was uploaded;

Speech recognition program 401 in client device 101 may save one or more pieces of update descriptive information data in a database 505. Update descriptive information data may be the date-times a file or information was last modified.

In an implementation consistent with the present invention, update descriptive information types may be an identifier, and may be a combination of one or more characters, or other name identifier recognizable by a speech recognition program 401 in client device 101 and an update website 121 in server 120.

Speech recognition program 401 in client device 101 may use the update descriptive information data received from update website 121 in server 120 to determine if speech recognition program 401 in client device 101 may need to update files, grammar file, data, executable code, and/or other information, available for update from update website 121 in server 120.

(C) Speech recognition program 401 in client device 101 may compare [act 2120] the date-time of one or more files, grammar file, data, executable code, and/or other information inside itself, against the date-time of update descriptive information data received from update website 121 in server 120.

(D) Speech recognition program 401 in client device 101 may identify which files, grammar file, data, executable code, and/or other information inside itself it may want to update [act 2125]. The identification process may be based upon the results of the comparison of date times.

Speech recognition program 401 in client device 101 may decide whether to perform a check for updates [act 2130].

Speech recognition program 401 in client device 101 may consider each file, grammar file, data, executable code, and/or other information separately [act 2135], as it may finalize it's decision on what to update.

Speech recognition program 401 in client device 101 may make a request [act 2140] to update website 121 in server 120 to download a file, grammar file, data, executable code, and/or other information. The request itself may include previously received update descriptive information data and/or other information.

(E) Update website 121 in server 120 may respond [act 2145] to speech recognition program 401 in client device 101, transmitting the requested file, grammar file, data, executable code, and/or other information available for update to speech recognition program 401 in client device 101. The files, grammar file, data, executable code, and/or other information available for update, may include the contents of a file or other information from database 505.

The requested file, grammar file, data, executable code, and/or other information available for update may be identified by update website 121 in server 120 based on the update descriptive information data used in step (C). Files, grammar file, data, executable code, and/or other information available for update that may be transmitted from update website 121 in server 120 to speech recognition program 401 in client device 101, may include xml files. Files, grammar file, data, executable code, and/or other information available for update that may be transmitted from update website 121 in server 120 to speech recognition program 401 in client device 101, may include dll's.

In an implementation consistent with the present invention, files, grammar file, data, executable code, and/or other information available for update that may be transmitted from update website 121 in server 120 to speech recognition program 401 in client device 101, may be dynamically generated from database 505.

Speech recognition program 401 in client device 101, may update itself by overwriting update-able existing files, [act 2150] grammar file, data, executable code, and/or other information with downloaded files, grammar file, data, executable code, and/or other information.

Steps (D) through (E) may occur in a [act 2155] programming loop for each file, grammar file, data, executable code, and/or other information available for update, which the speech recognition program 401 in client device 101 may determine it wants to update.

Speech recognition program 401 in client device 101, may now function with updated files.

In an implementation consistent with the present invention, a keyboard may be utilized to input data into text boxes and check boxes.

In an implementation consistent with the present invention a speech recognition program may be utilized to input data into text boxes and check boxes.

In an implementation consistent with the present invention a mouse may be utilized to input data into text boxes and check boxes.

In an implementation consistent with the present invention a multi-modal product may be utilized to input data into text boxes and check boxes.

CONCLUSION

A system and method for updating a speech recognition program. The system provides a speech recognition program, an update website for updating a speech recognition program, and a database for storing data that may be used to update a speech recognition program. A user may utilize an update website, to add, modify, and delete speech recognition program information that may include: speech commands, dll's, multimedia files, executable code, and other information. Speech recognition program may communicate with update website to request information about possible updates. Update website may send a response consisting of Information to speech recognition program. Speech recognition program may utilize received information to decide what speech commands, dll's, multimedia files, executable code, and other information it may want to download. A speech recognition program may send one or more requests to update website to download speech commands, dll's, multimedia files, executable code, and other information. Update website may respond by transmitting, requested speech commands, dll's, multimedia files, executable code, and other information, to a speech recognition program. Speech recognition program may overwrite speech commands, dll's, multimedia files, executable code, and other information, with newly received speech commands, dll's, multimedia files, executable code, and other information.

The scope of the invention is defined by the following claims and their equivalents.

What is claimed is:

1. A method of updating a speech recognition program, the method comprising:
    loading a speech recognition program;
    sending demographic information from the loaded speech recognition program to a website, the demographic information describing population characteristics;
    based on the demographic information, receiving updated speech recognition program information at the loaded speech recognition program;
    making a comparison, within the loaded speech recognition program, of self-identification information that identifies a product edition of the loaded speech recognition program with the updated speech recognition program information;
    determining within the loaded speech recognition program at least one component corresponding to the loaded speech recognition program that needs to be updated;
    in response to determining the at least one component, requesting at least one update file corresponding to the at least one component to be transmitted from the website to the loaded speech recognition program; and
    updating the at least one component of the loaded speech recognition program with the at least one update file so as to provide an updated speech recognition program.

2. The method of claim 1 wherein speech recognition program information includes one or more of the list consisting of:

a file, a grammar file, a speech command file, a specialized speech command file, data, executable code, a multimedia file, a dll, a demographic variable data, or other information.

3. The method of claim 1 further comprising the steps of: generating an updated grammar file; and updating the loaded speech recognition program with the updated grammar file.

4. The method of claim 1 further comprising the step of: updating the loaded speech recognition program with a multimedia file.

5. The method of claim 1 further comprising the step of: updating the loaded speech recognition program, with a dll.

6. The method of claim 1 further comprising the step of: updating the loaded speech recognition program, with executable code.

7. The method of claim 1 further comprising the step of: updating the loaded speech recognition program, with a speech command file.

8. The method of claim 1 further comprising the steps of: creating demographic variable data linked to a speech command; and updating the loaded speech recognition program with the updated speech recognition program information based upon which demographic variable data are linked to the speech command.

9. The method of claim 1 further comprising the step of: dynamically generating updated speech recognition program information from the website.

10. A system for updating a speech recognition program, the system comprising:

a non-transitory computer readable medium having stored thereon a speech recognition program that looks for updates to the speech recognition program by: sending demographic information describing population characteristics corresponding to the speech recognition program to an update website, receiving updated speech recognition program information, making a comparison of self-identification information that identifies a product edition of the loaded speech recognition program with the updated speech recognition program information, and evaluating if updates are needed by: determining at least one component corresponding to the loaded speech recognition program that needs to be updated, determining whether to update the at least one component based on the received updated speech recognition program information, requesting at least one update file corresponding to the at least one component, and updating the at least one component of the loaded speech recognition program with the at least one update file to provide an updated speech recognition program;

an update website that is accessed over a web browser to generate the updates for the speech recognition program, and downloads the updates to the speech recognition program; and a database interfaced with the update website that stores inputs, speech recognition program information, and updates files and is readable.

* * * * *